US010520909B2

(12) United States Patent
Stagg et al.

(10) Patent No.: US 10,520,909 B2
(45) Date of Patent: Dec. 31, 2019

(54) METHOD, SYSTEM AND RELATED DEVICES FOR OPERATING MULTIPLE CRANES IN UNISON

(71) Applicant: Laird Technologies, Inc., Chesterfield, MO (US)

(72) Inventors: David Stagg, Flat Rock, NC (US); Paul-André Corbeil, Québec (CA); Pierre Montreuil, Québec (CA); Luc Ethier, Québec (CA)

( * ) Notice: Subject to any disclaimer, the term of this patent is extended or adjusted under 35 U.S.C. 154(b) by 0 days.

(21) Appl. No.: 16/152,018

(22) Filed: Oct. 4, 2018

(65) Prior Publication Data

US 2019/0041821 A1 Feb. 7, 2019

Related U.S. Application Data

(63) Continuation of application No. 15/303,708, filed as application No. PCT/IB2015/053572 on May 14, 2015, now Pat. No. 10,108,164.

(Continued)

(51) Int. Cl.
  *G05B 19/042* (2006.01)
  *G06Q 10/06* (2012.01)
  *G06Q 50/08* (2012.01)

(52) U.S. Cl.
  CPC ......... *G05B 19/0426* (2013.01); *G06Q 10/06* (2013.01); *G06Q 50/08* (2013.01); *G05B 2219/23045* (2013.01)

(58) Field of Classification Search
  CPC ...... G05B 19/0426; G05B 2219/23045; G06Q 10/06; G06Q 50/08
  See application file for complete search history.

(56) References Cited

U.S. PATENT DOCUMENTS 8,195,368 B1 6/2012 Leban et al.
9,272,883 B2 3/2016 Behnke
(Continued)

FOREIGN PATENT DOCUMENTS

CN 202322054 U 7/2012
WO WO-2002014202 2/2002
(Continued)

OTHER PUBLICATIONS

Canadian Office Action dated Feb. 6, 2018 for Canadian application No. 2948778 which claims priority to the same parent application as the instant application; 5 pages.
(Continued)

*Primary Examiner* — Yuhui R Pan
(74) *Attorney, Agent, or Firm* — Harness, Dickey & Pierce, P.L.C.; Anthony G. Fussner

(57) ABSTRACT

A crane control system for controlling a plurality of cranes is provided. The crane control system in some embodiments includes a master controller unit, at least one computer readable memory for storing a plurality of tokens, each token from the plurality of tokens associated with a respective crane from the plurality of cranes, and a processing unit responsive to commands inputtable by an operator of the master controller unit to send the commands to individual cranes from the plurality of cranes, wherein the processing unit associates the commands with respective tokens to control the cranes associated with those tokens. The crane control system in some embodiments also includes a processing unit that is responsive to a signal indicative of a synchronization loss to issue a command to bring the plurality of cranes into a safe condition, such as an emergency stop, or a corrective action.

16 Claims, 18 Drawing Sheets

Related U.S. Application Data

(60) Provisional application No. 61/994,468, filed on May 16, 2014, provisional application No. 62/109,936, filed on Jan. 30, 2015.

(56) References Cited

U.S. PATENT DOCUMENTS

| | | |
|---|---|---|
| 10,108,164 B2 | 10/2018 | Stagg et al. |
| 2005/0053450 A1 | 3/2005 | Kantola et al. |
| 2006/0025075 A1 | 2/2006 | Chung |
| 2006/0273057 A1 | 12/2006 | Zollondz et al. |
| 2007/0204077 A1 | 8/2007 | Ootsuka et al. |
| 2008/0165025 A1 | 7/2008 | Morath |
| 2009/0009358 A1 | 1/2009 | Munzebrock |
| 2011/0127229 A1 | 6/2011 | Laliberte et al. |
| 2014/0251935 A1* | 9/2014 | Behnke ............ B66C 13/18 212/285 |
| 2015/0284225 A1* | 10/2015 | Hall ............... B66D 1/26 254/290 |
| 2016/0272471 A1 | 9/2016 | Jaipaul |
| 2017/0031339 A1 | 2/2017 | Corbeil et al. |

FOREIGN PATENT DOCUMENTS

| | | |
|---|---|---|
| WO | WO-2013030092 A1 | 3/2013 |
| WO | WO-2013170026 A1 | 11/2013 |
| WO | WO-2015173773 A2 | 11/2015 |

OTHER PUBLICATIONS

European Search Report dated Jan. 18, 2017 for EP Application No. 15792116.4 which claims priority to the same parent application as the instant application; 5 pages.
International Search Report and Written Opinion dated Feb. 20, 2016 for PCT Application No. PCT/IB15/53572 filed May 14, 2015 which is the parent application to the instant application, 14 pages.
European Office Action for EP Application No. 21086074 (published as EP3142956A) which claims priority to the same parent application as the instant application, dated Jan. 31, 2019, 7 pages.
"Crane Radio Control", Jan. 1, 2013 (Jan. 1, 2013); pp. 1-12, https:www.konecranes.jp/sites/default/files/download/konecranes_brochure_cranes_radio_control_en.pdf.

* cited by examiner

FIG. 10A

204"₁ — Available Cranes: Crane #1, Crane #2; Cranes under control: A, B, C, D; ID: 192.168.0.1 t=0

204"₂ — Available Cranes: Crane #1, Crane #2; Cranes under control: A, B, C, D; ID: 192.168.0.2

804:

| Crane No. | Token | Status | Controller ID. |
|---|---|---|---|
| Crane#1 | 192.168.0.101 | available | |
| Crane#2 | 192.168.0.102 | available | |

FIG. 10B

204"₁ — Available Cranes: ; A: Crane #1, B: Crane #2, C, D; ID: 192.168.0.1 t=1

204"₂ — Available Cranes: ; A, B, C, D; ID: 192.168.0.2

804:

| Crane No. | Token | Status | Controller ID. |
|---|---|---|---|
| Crane#1 | 192.168.0.101 | non-available | 192.168.0.1 |
| Crane#2 | 192.168.0.102 | non-available | 192.168.0.1 |

FIG. 10C

$204''_1$ Available Cranes: Crane #2

Cranes under control:
| A | Crane #1 |
| B | |
| C | |
| D | | t=2a    ID: 192.168.0.1

$204''_2$ Available Cranes: Crane #2

Cranes under control:
| A | |
| B | |
| C | |
| D | |

ID: 192.168.0.2

804

| Crane No. | Token | Status | Controller ID: |
|---|---|---|---|
| Crane#1 | 192.168.0.101 | non-available | 192.168.0.1 |
| Crane#2 | 192.168.0.102 | available | |

FIG. 10D

$204''_1$ Available Cranes:

Cranes under control:
| A | Crane #1 |
| B | |
| C | |
| D | | t=2b    ID: 192.168.0.1

$204''_2$ Available Cranes:

Cranes under control:
| A | Crane #2 |
| B | |
| C | |
| D | |

ID: 192.168.0.2

804

| Crane No. | Token | Status | Controller ID: |
|---|---|---|---|
| Crane#1 | 192.168.0.101 | non-available | 192.168.0.1 |
| Crane#2 | 192.168.0.102 | non-available | 192.168.0.2 |

METHOD, SYSTEM AND RELATED DEVICES FOR OPERATING MULTIPLE CRANES IN UNISON

CROSS-REFERENCE TO RELATED APPLICATIONS

This application is a continuation of U.S. patent application Ser. No. 15/303,708 filed Oct. 12, 2016, which published as US2017/0031339 on Feb. 2, 2017 and is issuing as U.S. Pat. No. 10,108,164 on Oct. 23, 2018.

U.S. patent application Ser. No. 15/303,708 is a U.S. national stage filing under 35 U.S.C. § 371 of International Application No. PCT/IB2015/053572 filed May 14, 2015, which published as WO 2015/173773 on Nov. 19, 2015.

PCT International Application No. PCT/IB2015/053572 claims priority to U.S. Provisional Patent Application No. 61/994,468 filed May 16, 2014 and U.S. Provisional Patent Application No. 62/109,936 filed Jan. 30, 2015.

The disclosures of the applications identified in the above paragraphs are incorporated herein by reference in their entirety.

FIELD

The invention generally relates to a system for operating cranes, in particular to a crane master controller unit and slave master controller unit for operating multiple cranes in unison. The invention also relates to a method for operating multiple cranes in unison.

BACKGROUND

Overhead cranes are commonly used in manufacturing and other industrial applications. An overhead crane is installed on parallel runways usually tied to a building structure. The crane has a bridge spanning across the gap of the runways, a trolley that traverses across the bridge and a hoist on the trolley that can move up or down and can lift objects. Overhead cranes, of this type, can be operated remotely using a master controller unit to lift and displace heavy objects.

In some situations, it is desirable to use multiple cranes to lift an object. For instance, when an object is too large to be lifted by a single trolley and hoist, two or more trolleys or hoists may be used. For example, a single bridge can have two trolleys where each of the trolleys has a single hoist, while in other cases the multiple cranes may consist of two bridges each with a trolley and a hoist.

In general, the task of controlling multiple cranes is more challenging for the operator than controlling a single crane. Therefore, there is a need in the industry for providing a user friendly system and method allowing to link the master controller unit of the operator to respective cranes, in a secure fashion to prevent inadvertently actuating a crane other than the one the operator intends to control.

SUMMARY

In accordance with a first aspect, the invention relates to a crane control system for controlling a plurality of cranes, the crane control system comprising a master controller unit; a computer readable storage for storing a plurality of tokens, each token from the plurality of tokens associated with a respective crane from the plurality of cranes; and a processing unit responsive to commands inputtable by an operator of the master controller unit to send the commands to individual cranes from the plurality of cranes, the processing unit being configured to associate the commands with respective tokens to control the cranes associated with the tokens.

In accordance with a second aspect, the invention relates to a crane control system for controlling a plurality of cranes in synchronism, the crane control system comprising: a master controller unit; a processing unit responsive to commands inputtable by an operator of the master controller unit to send commands to the plurality of cranes to operate the cranes in synchronism, the processing unit being responsive to a signal indicative of a loss of synchronization between the cranes to output a command to bring one or more of the plurality of cranes in a safe condition.

In accordance with a third aspect, the invention relates to a crane control system for controlling cranes, the crane control system comprising: a master controller unit, including a user interface for receiving user commands to control cranes, the user interface including a mode selector allowing the user to select a mode of operation among a plurality of modes of operation, the plurality of modes of operation including a first mode of operation and a second mode of operation; (i) when the mode selector is in the first mode of operation the master controller unit being configured to respond to user commands input at the user interface to output first command signals directed to a single crane; (ii) when the mode selector is in the second mode of operation the master controller unit being configured to respond to user commands input at the user interface to output second command signals directed to two or more cranes, each crane of the two or more cranes having at least two motion axes, the second command signals directing at least one motion axis of one crane to operate in unison with at least one motion axis on another crane.

In accordance with a fourth aspect, the invention relates to a crane control system for controlling cranes, the crane control system comprising: a master controller unit, including a user interface for receiving user commands to control cranes, the master controller unit being configured to respond to user commands input at the user interface to output command signals directed to two or more cranes, each crane of the two or more cranes having at least two motion axes, the command signals directing at least one motion axis of one crane to operate in unison with at least one motion axis on another crane; the user interface including a position selection mechanism configured to allow the user to select a position among a plurality of positions; in response to selection of a position among the plurality of positions the master controller unit outputting command signals directed to the two or more cranes to direct the cranes to move to the selected position.

In accordance with a fifth aspect, the invention provides a crane system, comprising a first crane, a second crane, a control system for controlling the first and second cranes in synchronism and a monitoring system for monitoring the first and second cranes for a loss of synchronization there between.

These and other aspects of the invention will now become apparent to those of ordinary skill in the art upon review of the following description of embodiments of the invention in conjunction with the accompanying drawings.

BRIEF DESCRIPTION OF THE DRAWINGS

A detailed description of embodiments of the invention is provided below, by way of example only, with reference to the accompanying drawings, in which:

FIGS. 10A, 10B, 10C and 10D are illustrations of the structure of data storage units in a first master controller unit, a second master controller unit and a centralized controller in accordance with a specific example of implementation of the invention.

It is to be expressly understood that the description and drawings are only for the purpose of illustrating certain embodiments of the invention and are an aid for understanding. They are not intended to be a definition of the limits of the invention.

DETAILED DESCRIPTION

Figure 1:
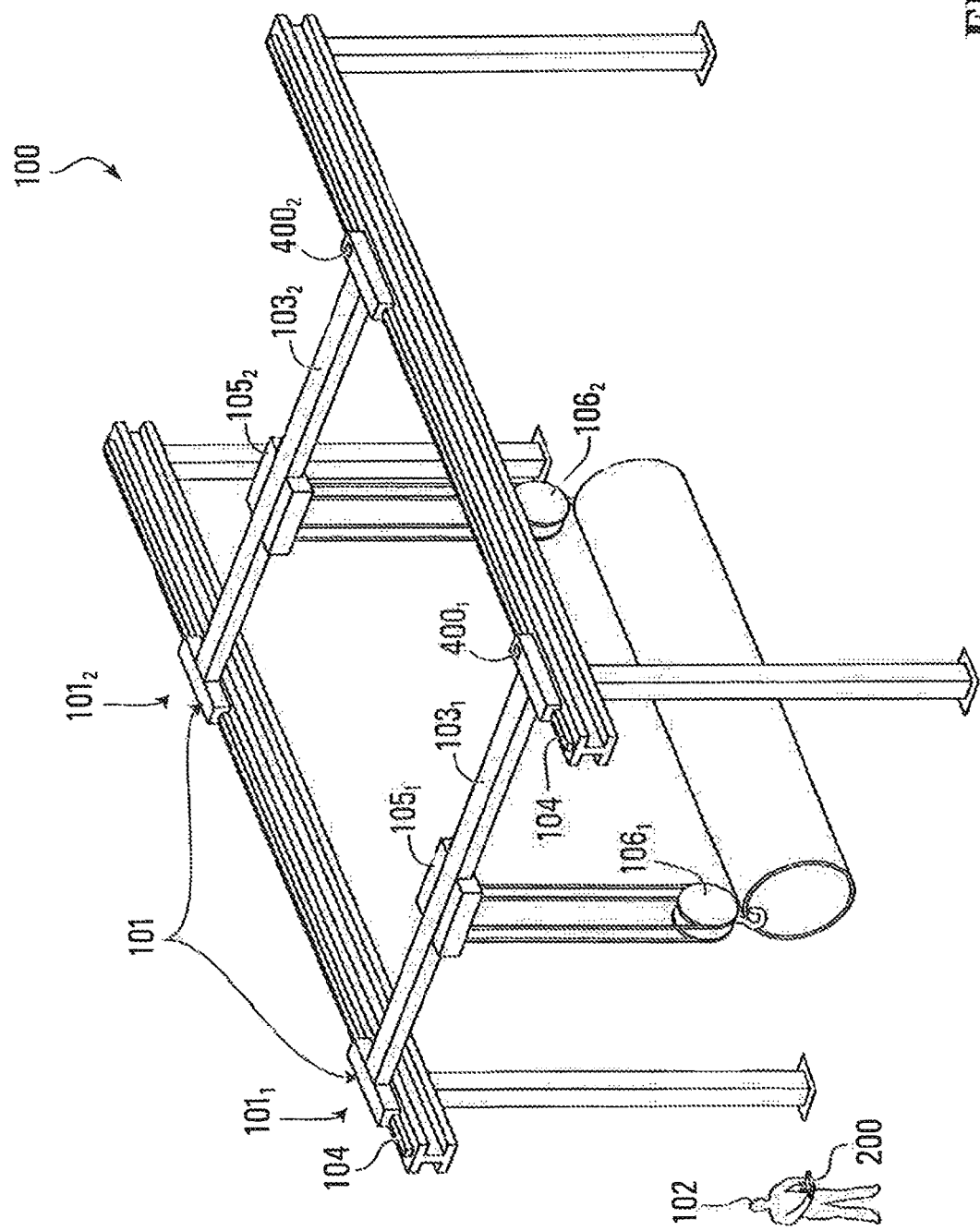
FIG. 1 is a perspective view of a crane controller system in accordance with a specific example of implementation of the invention.

FIG. 1 shows a crane control system 100 for controlling a plurality of cranes 101. In this example, the crane control system 100 includes a master controller unit 200, which is operable by a user or operator 102 to control the plurality of cranes 101. FIG. 1 illustrates two overhead cranes 101$_1$ and 101$_2$ that are bottom running on single girder bridges 103$_1$ and 103$_2$, respectively. The bridges 103$_1$ and 103$_2$ span across a gap of the two parallel runways 104 and the bridges 103$_1$ and 103$_2$ are movable along the two parallel runways 104. Also, as illustrated, trolleys 105$_1$ and 105$_2$ are traversable across the bridges 103$_1$ and 103$_2$, respectively. Each trolley 105$_1$ and 105$_2$ includes a hoist 106$_1$ and 106$_2$, respectively, that can move up or down. Each crane 101$_1$ and 101$_2$ also has a slave crane control unit 400$_1$ and 400$_2$, respectively, for receiving commands from the master controller unit 200 to control the movement of the crane (i.e., the movement of the bridge, trolley and hoist).

Other overhead crane configurations are possible. For example, the invention may be implemented on cranes having bridges with a single or double girder or having trolleys that are top running instead of being bottom running along the bridge. In other cases, the cranes may be provided with multiple trolleys and hoists per bridge.

Although not illustrated in FIG. 1, the crane control system 100 includes at least one computer readable data storage unit for storing a plurality of tokens, each token being associated with a respective crane. Furthermore, although not illustrated in FIG. 1, the crane control system 100 also includes a data processing unit that is responsive to commands input by the operator 102 of the master controller unit 200 for composing command data strings and sending the command data strings to individual cranes 101$_1$ and 101$_2$, wherein the data processing unit associates the commands with the respective tokens to control the cranes associated with those tokens. The computer readable data storage unit and the data processing unit will be discussed in more detail in the example implementations below.

Various implementations of the crane control system 100 will now be discussed by way of the following examples. For ease of reference, in discussing the various implementations of the crane control system 100, a "prime" (') indicator is included on previously introduced reference characters to indicate a variant of the previously introduced element or embodiment.

Master Controller Unit

Figure 2:
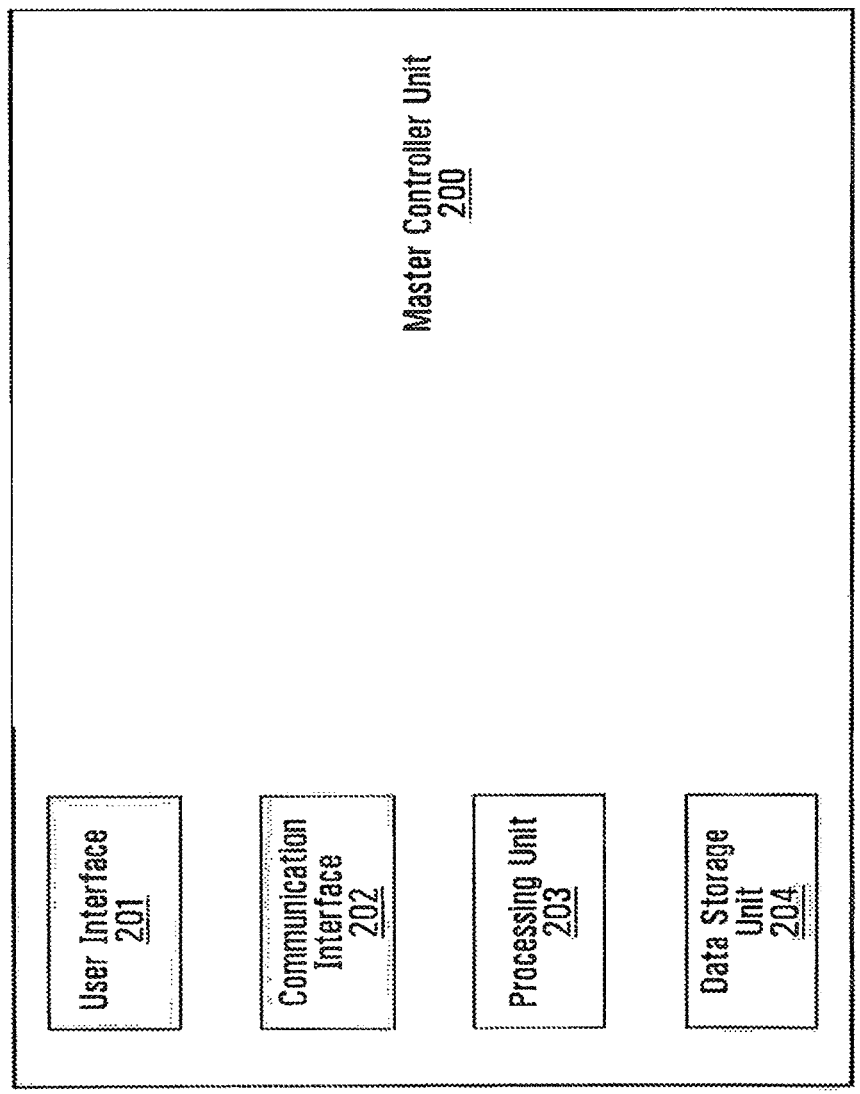
FIG. 2 is a block diagram of a master controller unit used in the system shown in FIG. 1.

FIG. 2 is a block diagram of a specific non-limiting example of a master controller unit 200. The master controller unit 200 is used for controlling a plurality of cranes 101. As shown, the master controller unit 200 includes a communication interface 202. The communication interface 202 is configured to communicate (e.g., send commands) with a plurality of cranes 101. The communication interface 202 may communicate with a plurality of cranes 101 by communicating with a plurality of slave crane control units 400, where each slave crane control unit 400 controls a respective crane (e.g., moves the bridge, hoist, and/or trolley) from the plurality of cranes 101 based on commands that it receives.

Figure 3:
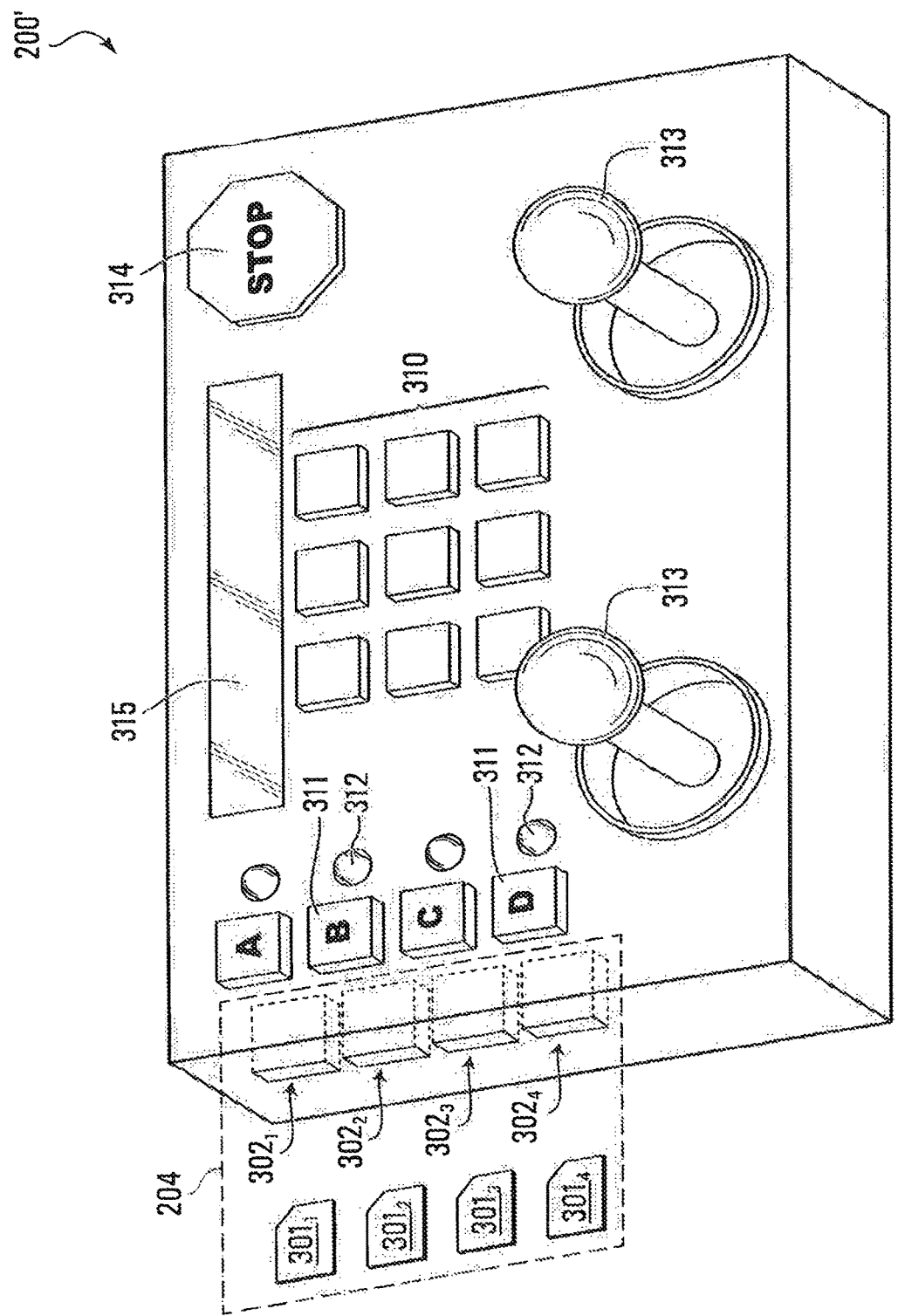
FIG. 3 is a perspective view of the control panel of the master controller unit, according to a first example of implementation of the invention.

The master controller unit 200 includes at least one computer readable data storage unit 204 for storing a plurality of tokens, where each token is associated with a respective crane 101. The tokens may be identifiers, such as addresses to identify uniquely each crane from the plurality of cranes 101. The computer readable data storage unit 204 may take various forms. For example, the computer readable data storage unit 204 may take the form of one or more programmed keys, chips, memory cards or any other suitable means (hereinafter referred to as "keys"), which are insertable into the master controller unit 200. FIG. 3 illustrates an example of the master controller unit 200', where the master controller unit 200' is portable. Each key from the plurality of keys 301$_1$, 301$_2$, 301$_3$ and 301$_4$ is insertable into a respective slot from a plurality of slots 302$_1$, 302$_2$, 302$_3$ and 302$_4$ of the master controller unit 200'. The housing of the master controller unit 200' has a series of slots 302$_1$, 302$_2$, 302$_3$ and 302$_4$ that can mechanically engage the keys 301$_1$, 301$_2$, 301$_3$ and 301$_4$. The slots 302$_1$, 302$_2$, 302$_3$ and 302$_4$ have electric terminals that mate with electric terminals of the keys 301$_1$, 301$_2$, 301$_3$ and 301$_4$ such that the content of the keys can be read. Although FIG. 3 illustrates four keys and four slots, it is appreciated that the number of keys and number of slots need not be limited to four, and may be more or may be less than four.

Each of the keys is encoded with a respective crane's token (e.g., the address or identifier of the crane). FIG. 1 illustrates an example of two cranes $101_1$ and $101_2$ controlled by the operator 102 with a portable master controller unit. Although FIG. 1 illustrates the use of the master controller unit 200, for this example it is to be understood that the operator 102 is using the portable master controller unit 200'. In this example, two keys $301_1$ and $301_2$ are inserted into slots $302_1$ and $302_2$, of the master controller unit 200', respectively. Furthermore, in this example, each crane $101_1$ and $101_2$ has a respective slave crane control unit $400_1$ and $400_2$, respectively, for receiving the commands from the control unit 200 and implementing the commands, by moving the respective cranes. The key $301_1$ is encoded with a token for the slave crane control unit $200_1$ and the key $301_2$ is encoded with a token for the slave crane control unit $200_2$. This configuration allows the operator 102 to control the cranes $101_1$ and $101_2$, either together or separately, which will be discussed in more detail later on.

This arrangement allows a factory, which operates multiple overhead cranes to issue a single token for each crane. As such, the physical insertion of a key in the slot of a first master controller unit of a first operator will preclude a second operator having a second master controller unit to take control of the crane being used by the first operator. In other words, only the operator in physical possession of the key will be able to control the crane that matches that key and a different operator with a different master controller cannot accidentally take control of the crane.

Referring back to FIG. 2, the master controller unit 200 also includes a user interface 201 for controlling the plurality of cranes. FIG. 3 shows a detailed example of implementation of the user interface 201. The user interface includes different input controls, displays, and/or indicators such as: one or more programmable buttons 310; a series of crane selection buttons 311; LED or other indicators 312; one or more joysticks 313; an emergency stop button 314; and/or a display 315 (e.g., LCD display). The one or more programmable buttons 310 may be programmed to control the functions of a plurality of cranes 101 or components of the cranes 101 (e.g., bridge, trolley, and/or hoist). The joysticks are used to control the movement of one or more cranes 101 or components of cranes 101. The series of crane selection buttons 311 may be used to select one or more cranes 101 that are to be maneuvered.

The display 315 may display information relating to the desired movements, the active crane selected from the plurality of cranes 101 (during a single crane mode of operation), the desired mode of operation (single crane versus multiple cranes), and/or any other suitable information. The display may be designed to be touch-sensitive and to respond to finger pressure on the display surface. In this embodiment, the display is likely to be larger than the one shown in the drawings to provide more display area on which the various icons or controls can be arranged for comfortable viewing and interaction by the operator.

Another possible option is to provide haptic control, which uses tactile feedback to communicate information to the operator. The haptic control can be used to convey information such as possible failures of cranes (the joystick vibrates when a malfunction is detected), when the hoist has reached a predetermined position indicating to the operator to stop the movement, etc.

Continuing with the specific and non-limiting example discussed above, when the key $301_1$ is encoded with a token for the control of crane $101_1$ and the key $301_2$ is encoded with a token for the control of crane $101_2$, the operator may push button A on the master controller unit 200' to select crane $101_1$ and/or may push button B to select crane $101_2$. In this example, the LED indicators 311 light-up to indicate to the operator 102 which crane or cranes are selected. In some embodiments, the user interface 201 also indicates (e.g., on the display 315) to the user which of the keys are inserted and the identity of the cranes corresponding to the keys, such that the operator can confirm that these are indeed the cranes to be controlled. The confirmation of which keys are inserted may be done by software running on the master controller unit 200 continuously scanning the keys inserted into the slots $301_1$, $301_2$, $301_3$, $301_4$. It will also be appreciated to the person skilled in the art that such a configuration will allow an operator to select only one crane or multiple cranes depending on the type of movement or operation the operator 102 desires to do.

As illustrated in FIG. 2, the master controller unit 200 includes a processing unit 203. The processing unit 203 is responsive to commands input by the operator 102, such that the commands are then sent to individual cranes from the plurality of cranes. The operator 102 of the master controller unit 200 enters commands via the user interface 201. The data processing unit 203 associates the commands with respective tokens to control the cranes associated with those tokens. The commands may be directed to a specific crane or may be directed to multiple cranes, depending on the mode of operation of the master controller unit 200. For instance, the operator 102 may have selected a single crane based on the key inserted in to the controller 200' and the processing unit will generate commands to the single crane. In other cases, the operator 102 may have selected multiple cranes based on the keys inserted into the controller 200' and the processing unit 203 will generate multiple commands to the multiple cranes.

The functionality of the processing unit 203 is software based. Specifically, the processing unit has a CPU that executes software residing on a machine-readable storage medium. The machine-readable storage medium may be part of the processing unit 203 and dedicated to the processing unit 203 or be a segment of a machine-readable storage device that provides data storage functions for the entire master controller unit 200.

The software controlling the operation of the processing unit 203 continuously scans the user interface 202 to detect user inputs. On the basis of the user inputs, the processing unit 203 will build a command data block that is sent to a single crane or replicated and sent to multiple cranes, depending on the mode of operation. In a specific example, when the operator depresses a joystick to direct the hoist of a crane to move down, the processing unit 203 will sense the joystick operation and determine that a hoist down move is being commanded. The processing unit 203 will then build a command data block to be sent to the crane such that the crane can execute the command. The command data block includes several components namely a command segment, which is a string of bits encoding the desired command. It will be understood that the string of bits will change depending on the actual movement being requested. The command data block also includes an address segment, which uniquely identifies the crane to which the command data block is being directed. The command data block may also include other segments to ensure a reliable communication, such as codes for error detection and/or error correction.

Optionally, the command data block includes a sender address segment to identify the address of the master controller unit 200 sending the command. The address distinguishes the master controller 200 from other master controllers that are active in the factory. In this fashion, if the crane or set of cranes being operated need to report something back to the master controller unit 200, the report will be sent to the correct address. An example of information that can be reported is crane alerts or malfunctions.

When the operator 102 selects crane $101_1$ (as the key $301_1$ for crane $101_1$ is inserted into the controller 200') and input commands via the user interface 201, the data processing unit 203 then processes the inputted command to generate a command data block. The processing unit 203 places the token derived from the key $301_1$ into the address segment of the command data block such that only the crane $101_1$, among the other cranes in the factory will accept the command. In other cases, where the operator 102 wants to control multiple cranes in synchronism, say crane $101_1$ and crane $101_2$ (as key $301_1$ for crane $101_1$ and key $301_2$ for crane $101_2$ is inserted into the controller 200') and input commands via the user interface 201, the data processing unit 203 will create two command data blocks, having identical command segments but different address segments, one address identifying crane $101_1$ and the other identifying the crane $101_2$.

Slave Crane Control Unit

Figure 4:
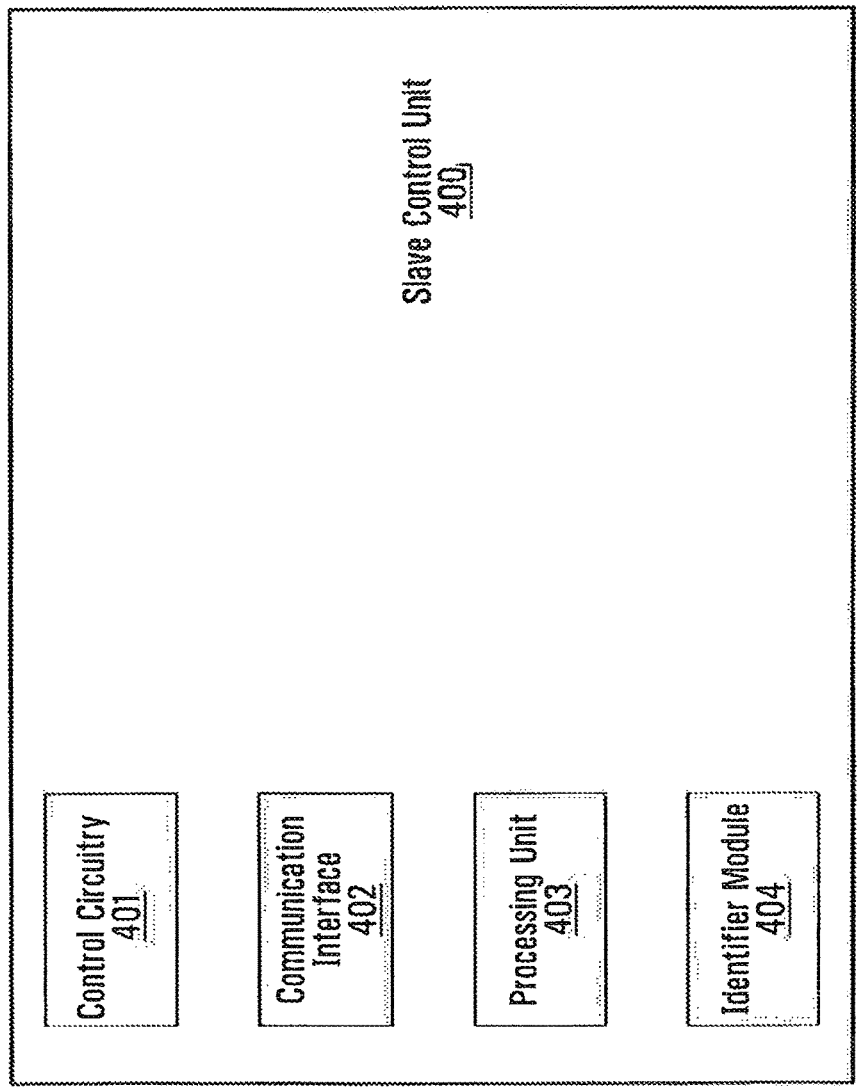
FIG. 4 is a block diagram of a slave crane control unit used in the system shown in FIG. 1.

FIG. 4 illustrates an example of a slave crane control unit $400_i$ from a plurality of slave crane control units 400. The slave crane control unit $400_i$ includes control circuitry 401 for controlling the movement of the crane (e.g., movement of the bridge, trolley, and/or hoist); a communication interface 402 for receiving the communications directly or indirectly from the master controller unit 200; a processing unit 403 for processing the received commands from the master controller unit 200, among other things; and an identifier module 404, for which a token, that has been obtained by the master controller unit 200, corresponds to.

The control circuitry includes the drives that operate the different motion axes to implement the commands sent by the master controller unit 200. The control circuitry can be based on servo drives to allow precise and repeatable positioning of the independently moveable crane components, such as the bridge, trolley and hoist. The servo drives operate on the basis of real-time position feedback information output by encoders that respond to actual component motion. Alternatively, the drives can be based on stepper motors, which may or may not use real-time position feedback information.

The identifier module 404 may be implemented in hardware or software (e.g., stored in computer readable memory). The identifier module 404 may be a simple dipswitch that can be set to a specific identifier code. In other examples, the identifier module 404 may be computer readable memory for storing an address, such as a network address (e.g., internet protocol (IP) addresses or media access control address (MAC) address) of the slave crane control unit $400_i$.

The processing unit 403 manages the operation of the slave crane control unit $400_i$. As in the case of the processing unit 203, the processing unit 403 is software based and it provides a certain number of lower level functions to manage the crane movements. Examples of those functions are provided below.

Generation of motion instructions to the control circuitry 401. The processing unit 403 receives the command data block from the master controller unit 200 and assuming that authentication has been successful (more on that later), it will convert the command segment into motion instructions directed to the specific motion axes. The processing unit 403 can also process higher level commands, such as constant speed commands. A constant speed command simply conveys a directive to the crane to move at a constant speed, instead of a simple forward or a backward movement in a certain direction. In the latter case, a significant degree of operator involvement and monitoring is required to ensure that the crane moves as desired since the operator needs to constantly operate the controls back and forth to achieve the desired rate of displacement. In contrast, a constant speed command is an easier and safer mode of operation because the operator specifies a speed to be enforced and the crane moves at that speed, until another command is received, such as a stop command or a command to change the set speed, either to accelerate or to slow down. In the case of a constant speed command, the processing unit 403 will operate the motion axis(es) as required in order to maintain the speed of motion as close as possible to the commanded speed.

Fault detection—monitors operational parameters of the crane to determine if a fault is occurring.

Status reporting to the master controller unit 200. The processing unit 403 collects operational information from the crane and structures it such that it can be sent to the master controller unit 200. For example, the processing unit 403 can collect information on the speed at which the crane travels and build a reporting data block in which this information is inserted and sent, via the communication interface 402 to the master controller unit 200. Also, if malfunctions are detected, the processing unit 403 builds a reporting data block and sends it to the master controller unit 200.

Communication Between the Master Controller Unit & Cranes

Figure 5:
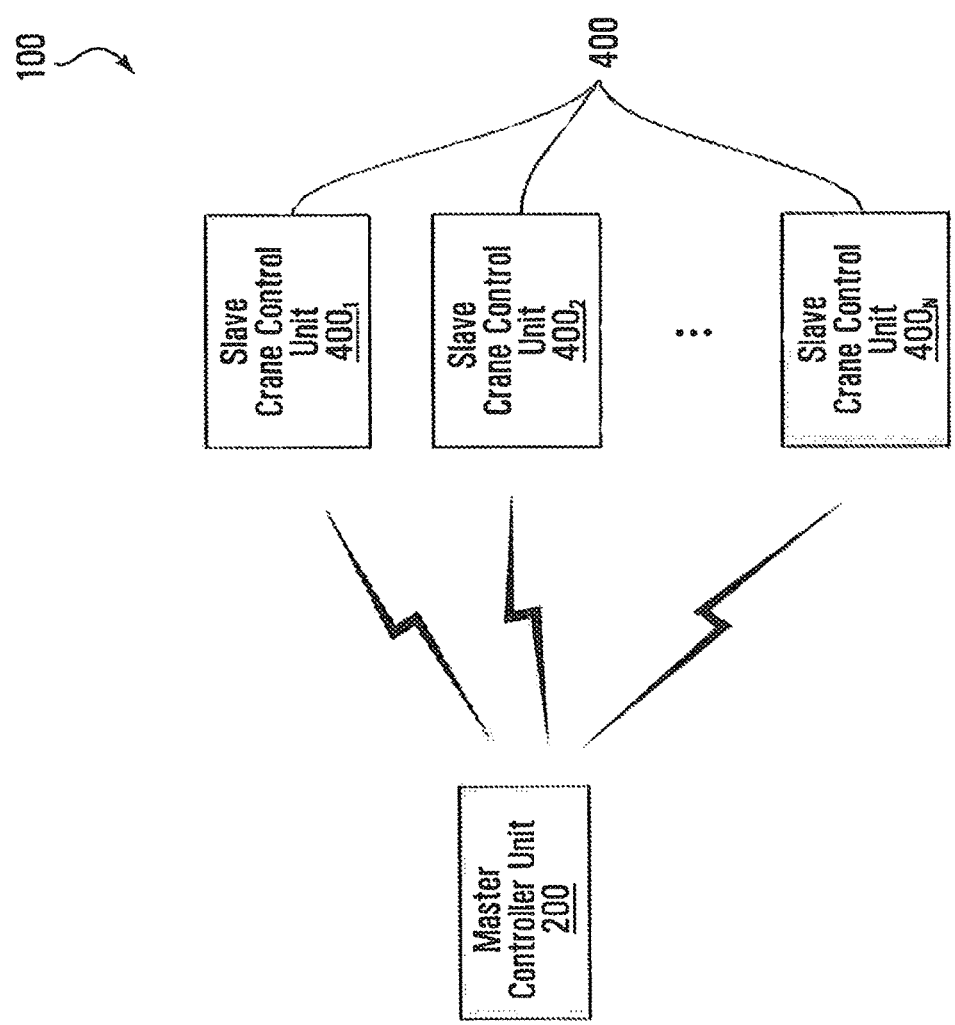
FIG. 5 is a block diagram of a communication organizational structure, illustrating various components of the system of FIG. 1, communicating with each other to convey commands issued by the master controller unit for implementation by multiple cranes.

In general, the type of slave crane control units 400 and/or the type of tokens used may dictate how the master controller unit 200 communicates with the plurality of slave crane control units 400. FIG. 5 illustrates an example of how the master controller unit 200 communicates with the plurality of slave crane control units 400 by sending a command directly to the one or more of the plurality of slave crane control units 400. The configuration illustrated in FIG. 5 may be suitable where dipswitches are used in the slave crane control units 400 or where the token corresponds to an address, which is a non-networked address. In other embodiments, as illustrated in FIG. 6, the master controller unit 200' communicates with the plurality of slave crane control units 400' indirectly by sending a command that is routed through a router 600.

Figure 6:
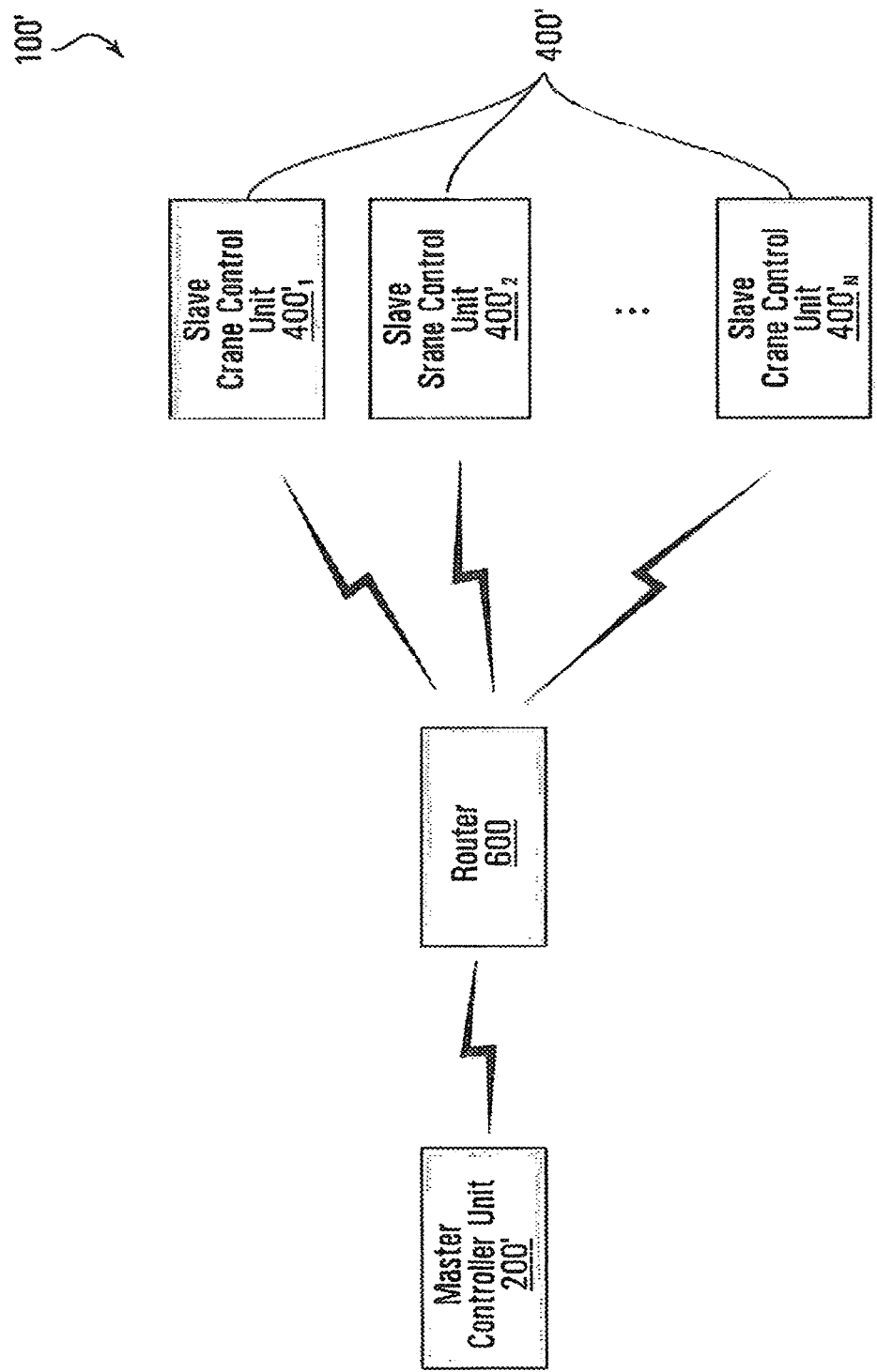
FIG. 6 is a block diagram of the communication organizational structure, according to a variant.

The configuration of FIG. 6 may be suitable where the token corresponds to a network address (e.g., the crane control system 100' is network based). In general, techniques for sending wireless signals (e.g., RF, IR (infrared), etc.) are within the knowledge of the person skilled, and the communication of the master controller unit 200 with the plurality of slave crane control units 400 should not be limited to embodiments illustrated in FIGS. 5 and 6.

Regardless of how a command is communicated (e.g., directly or indirectly) from the communication interface 202 of the master controller unit 200 to the communication interfaces 402 of the plurality of slave crane control units 400, the command is sent to the plurality of cranes 101 for movement of the cranes 101 (e.g., movement of the bridge, trolley, and/or hoist). As indicated previously, when a command is sent from the master controller unit 200, the command includes an identifier (e.g., address, network address, or any other suitable identifier) of the master controller unit 200 sending the command and the token corresponding to the crane that the master controller unit 200 wishes to control or move, along with the command that indicates the movement of the crane. In some embodiments, the communication interface 202 of the controller 200 acts as transmitter and the communication interfaces 402 of the slave crane control units 400 act as a receiver. In other embodiments, the communication interface 202 of the master controller unit 200 and the communication interfaces 402 of the slave crane control units 400 both have transmission and reception capabilities (e.g., they are both transceivers (i.e., receivers and transmitters)). In certain embodiments, the slave crane control units 400 can send communications back to the master controller unit 200. For example, acknowledgements of commands may be sent from the slave crane control units 400 to the master controller unit 200. The acknowledgement signal may include the identifier of the master controller unit 200 and the identifier or token of the slave crane control unit 400. Furthermore, in some embodiments, the feedback of information from the slave crane control units 400 to the master controller unit 200 can include information relating to the movement of the cranes (e.g., movement of the bridge, hoist, and/or trolley), information regarding the synchronization of the movement of multiple cranes, loss of synchronization and/or any other suitable information.

Other Embodiments of the Master Controller Unit

Figure 7:
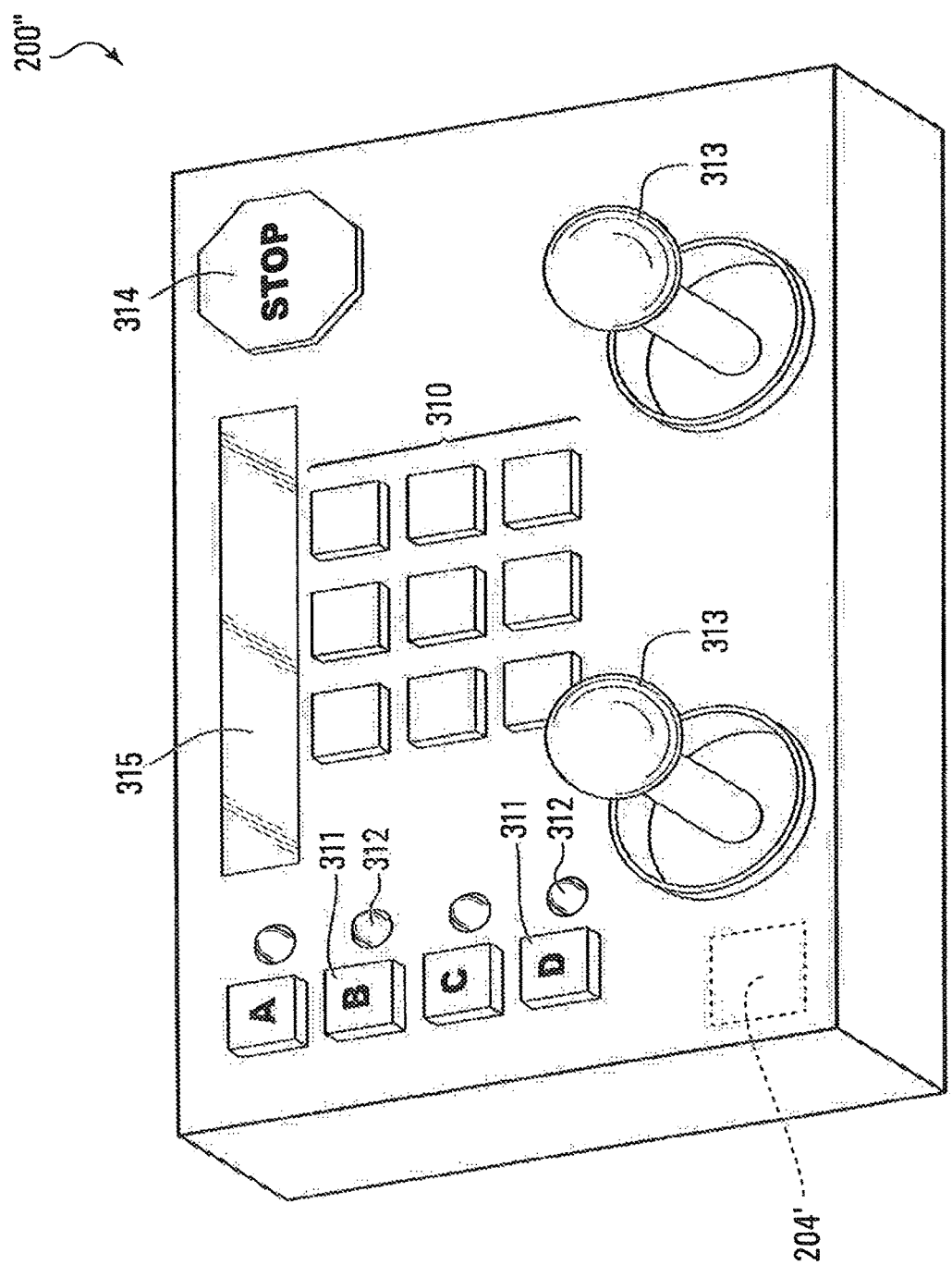
FIG. 7 is a perspective view of the control panel of the master controller unit, according to a variant.

Referring back to FIG. 2, and as previously discuss, the master controller unit 200 includes at least one computer readable memory 204 which may take various forms. In alternative embodiments, the at least one computer readable memory is non-removable memory 204' (i.e., it is not an easily removable memory card or key). FIG. 7 illustrates an example of a master controller unit 200" where non-removable memory 204' is used. In this example, the memory 204' stores the token after it has been procured. The token for a specific crane may be obtained by the operator 102 by walking within a proximity to a specific crane that the operator wants to control and by pushing a button indicating the operator wishes to take control of this crane with the master controller unit 200". For example, IR sensors may be provided on hoists $106_1$ $106_2$, such that when the master controller unit 200" is placed within a certain proximity of a hoist, the master controller unit 200" is able to take control of the crane that drives that hoist. In a specific and non-limiting example, if the operator 102 wants to obtain the token for crane $101_1$ the operator 102 may walk up to the hoist $106_1$ of the crane $101_1$ and pushes a button on user interface 201 of the master controller unit 200" to obtain the token for crane $101_1$. In this example, the master controller 200" has an IR transceiver which can communicate with the IR transceiver on the hoist. When both are within communication range, they perform an address exchange operation. The address exchange operation is a two way data exchange. During a first step, the crane sends its unique address to the master controller 200" and during the second step the master controller 200" sends its own unique address to the crane. Each entity, the crane and the master controller 200" will assemble a compound address which is a combination of its own address and the address of the other entity. Assuming each crane in the factory and each master controller are assigned unique addresses, the compound address will uniquely designate the pair of entities. The compound address is used to tag all communications between the crane and the master controller unit such that only the crane that has been "married" via the IR link with the master controller unit 200" will accept the commands with that tag. Similarly, only the master controller unit 200" "married" to the crane will accept data communications from that crane.

By using an IR communication between the crane and the master controller unit 200" to perform the address exchange, the operator must physically walk to the crane that he or she wants to control, reducing the possibility of selecting and remotely operating the wrong crane. Near field communication mechanisms other than IR can be used, such as RFID interrogation.

In other embodiments, the operator may take control of a specific crane by sending a command from the master controller unit 200" to a specific slave crane control unit from the plurality of slave crane control unit 400" to obtain the token, and the slave crane control unit sends the token back if it is not in use by a different master controller unit. In a specific and non-limiting example, if the operator 102 wants to obtain the token for crane $101_1$ the operator 102 may push a button on user interface 201 of the master controller unit 200" to indicate the desire to obtain the token for crane $101_1$. For example, the operator 102 may view through the display 315 of the user interface 201 of master controller unit 200" all cranes in the plant and then select crane $101_1$. Continuing with this specific example, if the token for crane $101_1$ is available (i.e., not in use by a different master controller unit) the token is then communicated from the slave crane control unit $400_1$" to the master controller unit 200". On the other hand, if the token for crane $101_1$ is not available (i.e., in use by a different master controller unit) the token is not communicated from the slave crane control unit $400_1$" to the master controller unit 200" and a message may be communicated from the slave crane control unit $400_1$" to master controller unit 200" that the token is not available and specify which master controller unit is currently using the token.

To obtain a token, a token exchange protocol is performed. Assuming the token is free to be taken, the protocol starts with an inquiry as to availability and if available, the token is sent to the master controller 200". When the token is sent the crane changes its status from "available" to "non-available" to prevent any other master controller unit 200" to take control of that crane. Similar to the address exchange process described earlier, the crane may store the address of the master controller unit 200" to build a compound address that uniquely identifies the crane/master controller unit 200" pair.

When the crane is no longer required, the master controller unit 200" releases the token. Without such explicit token release operation, the crane will remain linked to the master controller 200". The token release occurs when the operator sends an explicit "release" command to the crane. When the crane receives the "release" command, it sends an acknowledgement to the master controller unit 200" to confirm reception of the "release" command such as to notify the operator that a "release" operation is occurring. The crane then initializes the address/token buffers to purge the address of the master controller unit 200" and acquires an "available" state. In the "available" state another master controller 200" can take control of the crane.

Figure 8:
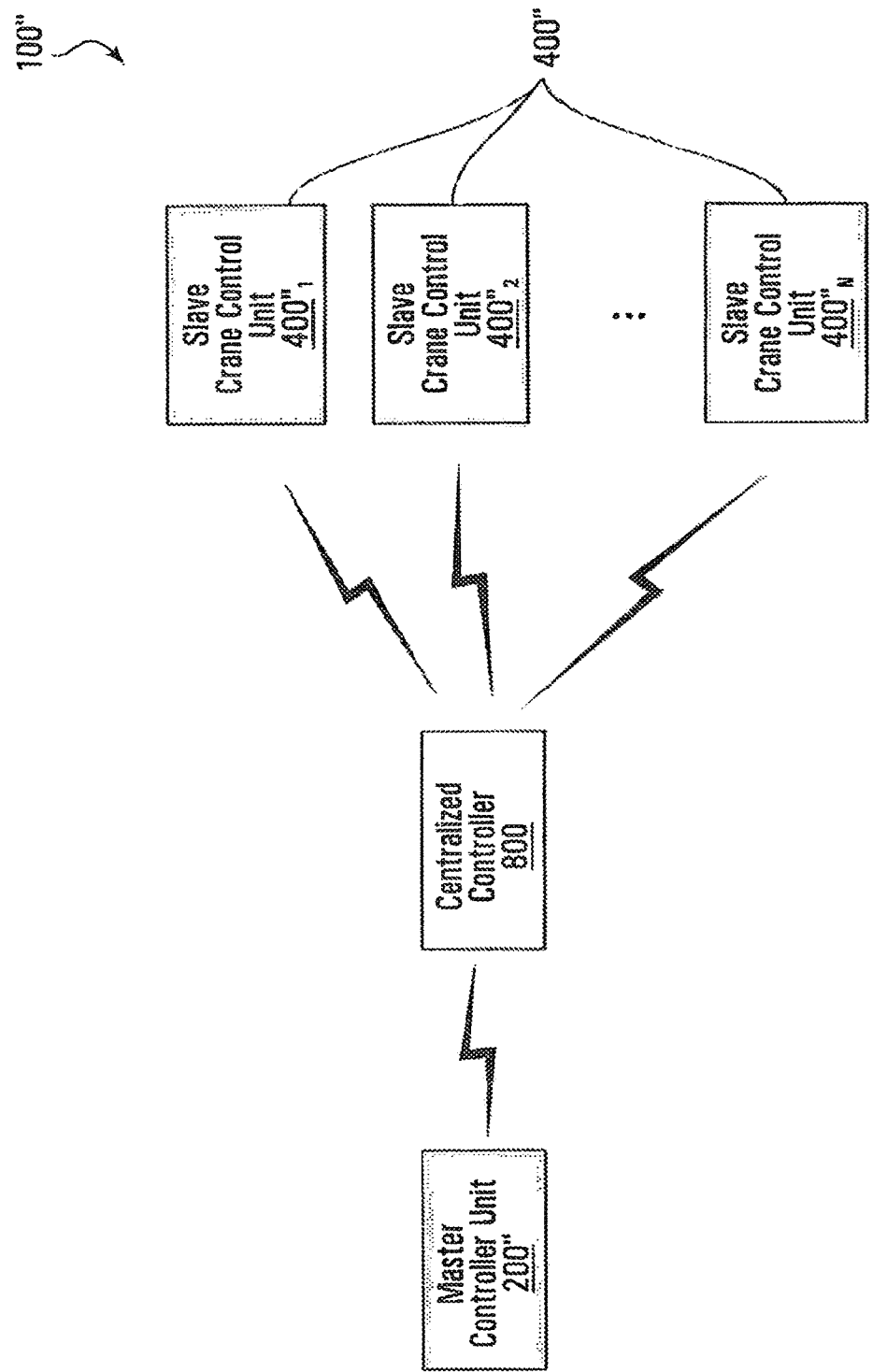
FIG. 8 is a block diagram of the communication organizational structure according to yet another variant.

FIG. 8 illustrates an embodiment in which a centralized controller 800 is used to perform the wireless linkage crane/master controller unit 200". The centralized controller 800 stores all of the tokens for the cranes 101. Furthermore, in embodiments where a centralized controller 800 is used, commands may be sent to the centralized controller 800 from the master controller unit 200" which then relays the commands to the plurality of slave crane control units 400" that are controlled simultaneously or to the single slave crane control unit 400", depending on the mode of operation of the master controller unit 200". The centralized controller 800 only relays the commands to the plurality of slave crane control units 400" if the command comes from a master controller unit that has the authority for the plurality of slave crane control units 400" that the master controller unit 200" is sending commands to. The functions and structure of the centralized controller 800 are discussed in more detail below.

The centralized controller 800 includes at least one computer readable storage device for storing the plurality of tokens, each token being associated with a respective crane from the plurality of cranes 100. The centralized controller 800 may also manage which master controller units 200 are able to operate which cranes 101 in a factory, such that no crane is operable by more than one control unit at any given time.

The centralized controller 800 links cranes with master controller units 200" by performing a linkage function with uses steps similar to the linkage procedures described earlier. The linkage function is managed fully by the centralized controller 800 and no direct communication between cranes and master controller units 200" takes place.

In this arrangement, each master controller unit 200" has a unique address and as mentioned earlier each crane has a unique token. When a master controller unit 200" wants to take control of a certain crane, it sends a control capture request to the centralized controller 800. The control capture request identifies the desired crane; if that crane is available for control the linkage procedure is initiated. Otherwise the linkage procedure is rejected. The master controller unit 200" is provided on its user interface with a selection mechanism that allows the operator to designate the crane that he/she wants to control. One option for the centralized controller 800 is to constantly broadcast the list of cranes that are available, such that only those that the master controller unit 800 can actually acquire are listed. That list is dynamically updated as cranes are linked to master controller units 200" and released such that at any moment the operator of a master controller 200" will see only the cranes that are available.

Once a control capture request is received by the centralized controller 800 the latter will store the address of the master controller unit 200" that is embedded in the request and will associate that address with the token of the crane to be controlled. The status of the crane is then changed from "available" to "not-available" and when the broadcasted list of available cranes is refreshed, the just acquired crane will no longer be on the list.

Commands issued to maneuver the crane from the master controller unit 200" are received by the centralized controller 800 which, on the basis of the association between the master controller unit 200" address (which is embedded in the command) and the token of the crane stored in the centralized controller 800, determines the identity of the crane to which the command is to be relayed. The centralized controller 800 then assembles a command data block by appending the command segment identifying the particular command the operator has input via the user interface of the master controller unit 200" to the address of the crane. The command data block is then sent out to the crane for implementation. Since the centralized controller 800 manages the association between the addresses of the master controller units 200" and the crane tokens, the possibility of mistakenly operating a crane other than the one intended to, is reduced significantly.

Whether the master controller 200" is set to control a single crane or a set of cranes, the linkage procedure and the command dispatch is the same. When multiple cranes are operated, the address of the master controller 200" is associated with the tokens of the respective cranes. When a command is issued by the master controller 200", that command is relayed to all the cranes associated with the master controller 200" address embedded in the received command.

Based on the discussion above, it will be appreciated that the centralized controller 800 performs two different functions. The first function is a token repository that manages the tokens and releases available tokens for linkage with master controller units. The second function is to act as a command relay to the cranes 101. That is, in the second mode of operation all commands from the master controller units 200" are communicated to the centralized controller 800 which then forwards the commands to one or more of the slave crane control units 400" of the cranes 101, if the master controller unit is authorized to control the one or more specified cranes.

The centralized controller 800 may include a processing unit (not illustrated), which executes software that enables the functionality of the centralized controller 800.

Figure 9:
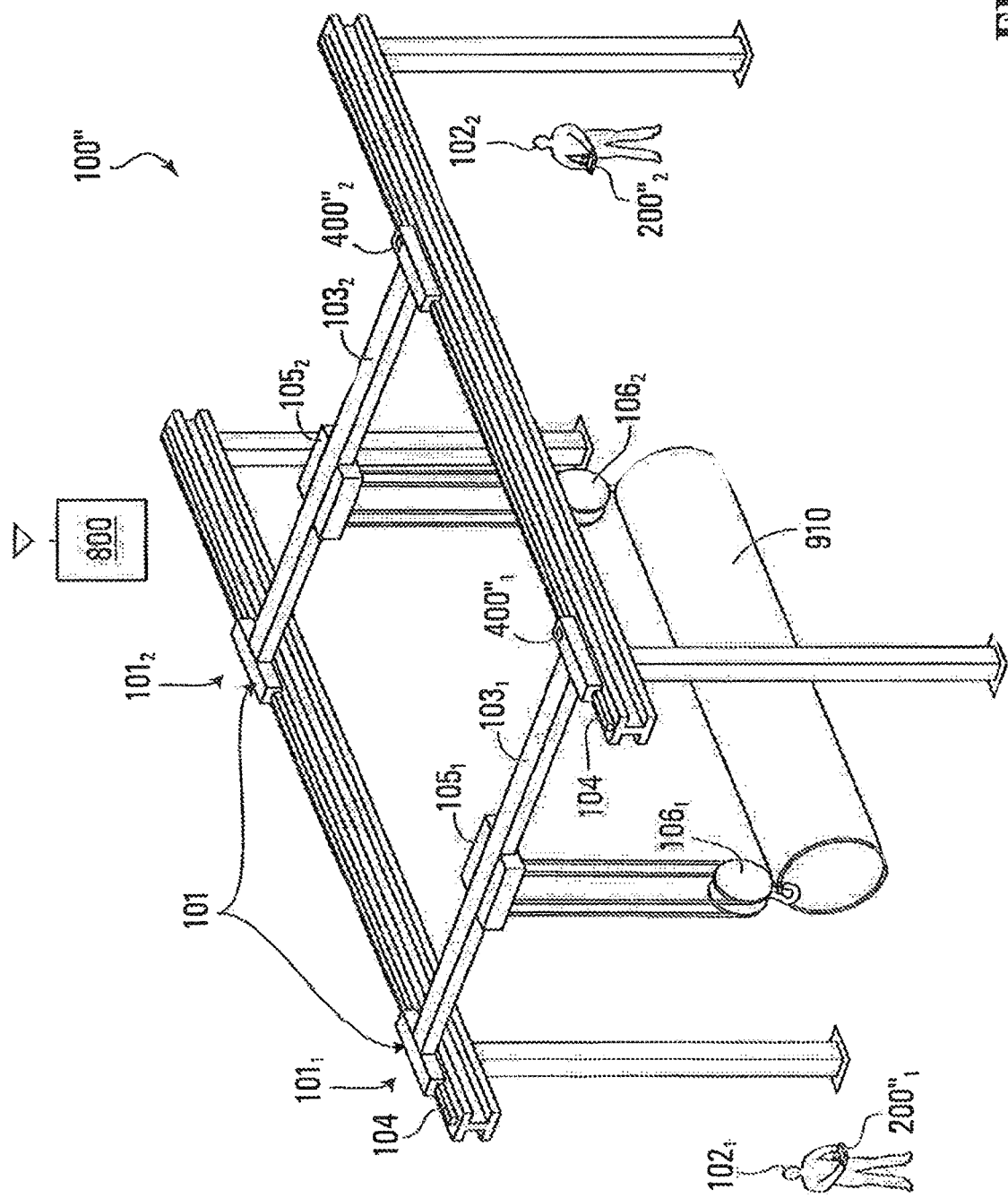
FIG. 9 is a perspective view of a variant of the crane controller system.

FIGS. 9-12 illustrate specific examples of the process for assigning tokens performed by the centralized controller 800. The embodiment shown in FIG. 9 illustrates a control option that makes it possible for two operators $102_1$ $102_2$ to control, in sequence a single crane or multiple cranes 101 for moving an object 910. When heavy and large objects are being lifted, a single operator may not be able to have a complete view of the object that is being lifted and moved. This may create a safety hazard as the operator is maneuvering an object without having a visual contact with all the furthest points of the object. To alleviate this drawback, the system is designed to allow two or more operators to alternatively take control the cranes. In this situation, the operators would likely be located at a distance from each other, close to different ends of the object such as to be able to observe the motion of the object. At any given moment, only one of the operators has control, with the exception of a limited set of commands that are always available to both (or more) operators. When an operator wants to actively control the set of cranes, the control authority is transferred to that operator. When another operator needs to take control, the control authority is passed to that operator and it is taken away from the previous operator, however all the operators can send commands relating to emergency situations, such as an emergency stop.

More specifically, in this example, the crane control system 100" is operated by a first operator $102_1$ having a master controller unit $200_1$" and a second operator $102_2$ having a master controller unit $200_2$" where a centralized controller 800 is used as a token repository and as a command relay to the cranes 101. With reference to FIG. 10A, none of the master controller units $200_1$" $200_2$" is associated with any of the cranes, at time t=0. As illustrated, the memory 804 of the centralized controller 800 stores the token for crane #1 (crane $101_1$) as the IP address 192.168.0.101 and indicates that the status of crane #1 is that it is available. Similarly, the memory 804 of the centralized controller 800 also stores the token for crane #2 (crane $101_2$) as the IP address 192.168.0.102 and indicates that that this crane's status is also available. The centralized controller 800 also broadcasts to both of the master controller units $200_1$" $200_2$" that crane #1 and crane #2 are available, which, in this example, the available cranes are stored in the memory $204_1$" $204_2$".

Figure 11:
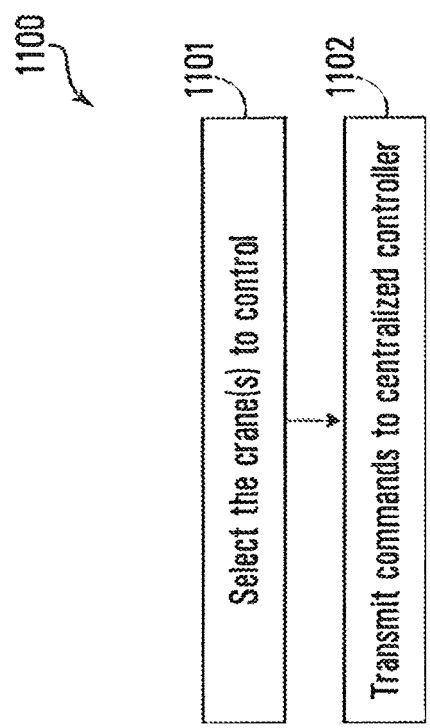
FIG. 11 is a flowchart of a process for controlling cranes.
Figure 12:
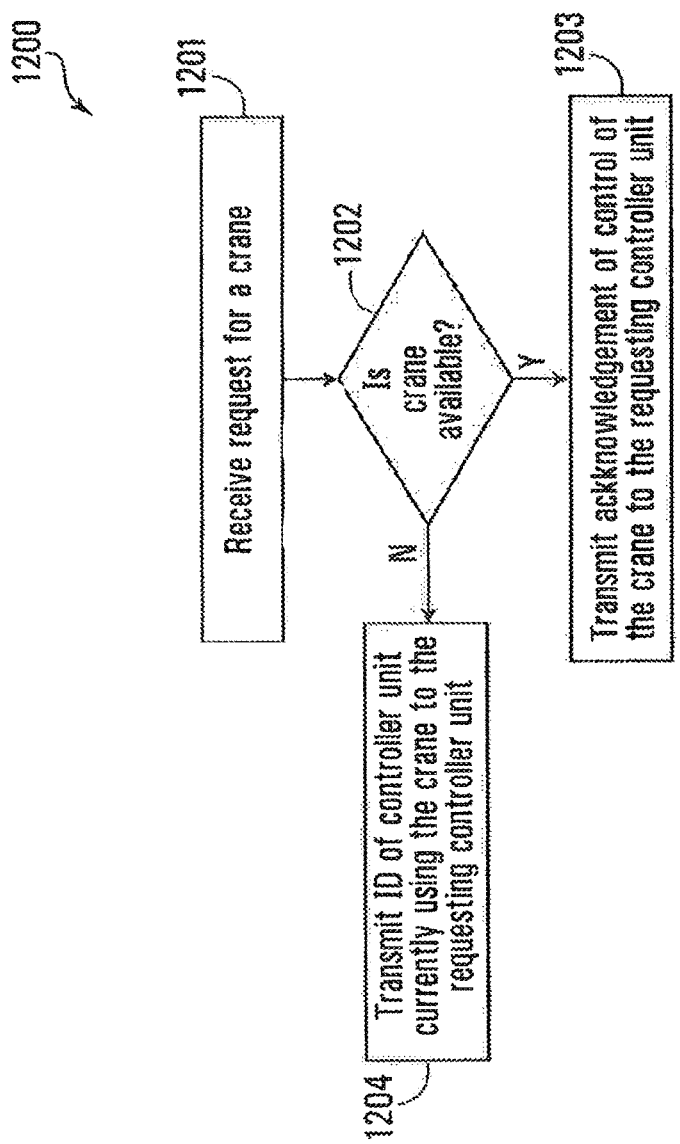
FIG. 12 is a flowchart of a process for determining if a crane is standing by and available for service or is already in use.

Now with reference to FIG. 11, at step 1101, the first operator $102_1$ enters in commands to link his master controller unit $200_1$" with tokens for cranes $101_1$ and $101_2$ via the user interface 201, by selecting the cranes that the operator desired to control from the list of available cranes. In this example, as both cranes $101_1$ and $101_2$ are available the master controller unit $200_1$" selects both cranes $101_1$ and $101_2$ and sends a request for these cranes to the centralized controller 800. More specifically, FIG. 12 shows the method 1200 that takes place in the centralized controller 800 when a request for a crane is received. In this example, at step 1201, a request for a crane is received from the master controller unit $200_1$" for both cranes $101_1$ and $101_2$. Then, at step 1202, it is determined that both of the cranes $101_1$ and $101_2$ specified in the request are available. As such, the next step is step 120 and acknowledgement that both of the requested cranes $101_1$ and $101_2$ are now under control by the master controller unit $200_1$" is transmitted to the master controller unit $200_1$".

FIG. 10B illustrates the memory space of the centralized controller 800 and the master controller units $200_1$" and $200_2$" at time t=1, where the centralized controller 800 has linked both cranes #1 and #2 ($101_1$ and $101_2$) with the master controller unit $200_1$" and where the master controller units $200_1$" has control of both cranes $101_1$ and $101_2$. As illustrated in FIG. 10B, the memory 804 indicates that the status of both of the cranes #1 and #2 ($101_1$ and $101_2$) as "non-available". Furthermore, the memory 804 also indicates that master controller unit $200_1$" is in control of crane #1 and crane #2 as the identifier, in the form of the IP address 192.168.0.1, of the master controller unit $200_1$" is stored in the memory space 804. Now referring back to FIG. 11, at step 1102, the master controller unit $200_1$" may then control both of the cranes $101_1$ and $101_2$ by communicating the commands in the form of command data strings to the centralized controller 800.

Then at a later time, the second operator $102_2$ having the master controller unit $200_2$" may then want to obtain control of crane #2 (crane $101_2$). However, crane #2 is currently in control by the master controller unit $200_1$" and its availability is not shown in the list of available cranes. As such, the master controller unit $200_1$" should not be able to request control of crane #2. In the event that the master controller unit $200_2$" does send a request for crane #2 to the centralized controller 800, the master controller unit $200_2$" will not be able to obtain control of crane #2. According to the steps of the method 1200, at step 1201 the request is received for crane $101_2$ and then at step 1202 it is determined that crane $101_2$ is currently being used by the master controller unit having the identifier 192.168.01 (i.e., master controller unit $200_1$"). As such, then at step 1204 the centralized controller 800 transmits to the master controller unit $200_2$" that crane #2 (crane $101_2$) is unavailable and in use by 192.168.01 (master controller unit $200_1$").

At this stage, the operator $102_2$ with the master controller unit $200_2$" wants to obtain control of crane #2 (crane $101_2$) and control of crane #2 can be done by two different ways. The first way that this can be done is the operator $102_2$ with the master controller unit $200_2$" can wait until the operator $102_1$ with the master controller $200_1$" sends a "release" command to the centralized controller 800 that the master controller $200_1$" no longer wants control of crane #2. At this stage, the centralized controller 800 removes the identifier (here the IP address 192.168.0.1) of the master controller $200_1$". For example FIG. 10C illustrates the memory space at time t=2a showing that the master controller $200_1$" no longer has control of crane #2 and that crane #2 is available to be obtained by a different master controller. At this stage, the operator $102_2$ with the master controller unit $200_2$" can then make a request to obtain control of crane #2.

The second way that the operator $102_2$ with the master controller unit $200_2$" can obtain control of crane #2 (crane $101_2$), is by a mechanics of pitching the control authority. That is, the operator $102_1$ with the master controller unit $200_1$" does not need to send a "release" command for the release of crane #2, but can pitch controlling authority of crane #2 to the master controller unit $200_2$". As illustrated in FIG. 10B, crane #2 is associated with the master controller unit $200_1$" and an identifier (i.e., the IP address 192.168.01.1) is stored in association with the token for crane #2. This association identifies that master controller unit $200_1$" has control authority. This association can be transferred from one master controller to another by sending a "transfer" command from the master controller that currently holds the control authority to the centralized controller 800. For example, the operator $102_1$ with the master controller unit $200_1$" can send a "transfer" command to the centralized controller that it wants the master controller $200_2$" to take control of crane #2. The effect of the "transfer" command is that master controller $200_1$" is relinquished the control authority. At this point the master controller unit $200_2$" receives acknowledgement of control of crane #2 is available. Then master controller unit $200_2$" can send to the centralized controller 800 a control authority "acceptance" command, and at this point the master controller $200_2$" would then be associated with crane #2 and can control crane #2. FIG. 10D illustrates the memory space of the centralized controller 800 and the master controller units $200_1$" and $200_2$" at time t=2b. As illustrated, the master controller unit $200_1$" has control of crane #1 (crane $101_1$) as controller identifier (192.168.0.1) of master controller unit $200_1$" is stored in association with crane #1 and the token (192.168.0.101) of crane #1. Similarly, as illustrated, the master controller units $200_2$" has control of crane #2 (crane $101_2$) as controller identifier (192.168.0.2) of master controller unit $200_2$" is stored in association with crane #2 and the token (192.168.0.102) of crane #2. As such, at this point in time in this example, the first operator $102_1$ having the master controller unit $200_1$" can control crane #1 (crane $101_1$) and the second operator $102_2$ having the master controller unit $200_2$" can control crane #2 (crane $101_2$). Although, the first operator $102_1$ having the master controller unit $200_1$" can control crane #1 (crane $101_1$) and the second operator $102_2$ having the master controller unit $200_2$" can control crane #2 (crane $101_2$), control commands are sent to cranes only if two conditions are met (1) the command must be from a master controller linked to the tokens and (2) the command must be from a master controller that holds command authority. There is, however, a subset of commands, such as an emergency stop command, which is implemented from any master controller unit, irrespective of who holds the control authority, as long as the master controller unit has been associated with the tokens.

It will be appreciated that although this example illustrates the tokens as IP addresses other types of tokens, such as identifiers or numbers may be used (e.g., a Boolean flag, a random generated number, etc.).

Similarly, it will be appreciated that although this example indicates the identifies of the master controllers stored in the memory of the centralized controller 800 as IP addresses, it could be possible for the centralized controller to have a list of all possible master controllers and set a flag in association with each master controller when the master controller obtains control. For example, the centralized controller 800 could store a table where each row corresponds to a crane's token and each column corresponds to each master controller's identifier or address and when a specific master controller take control of a specific crane the intersecting column and row would be set with a flag (such as a Boolean flag).

A variant of the configuration discussed above includes the centralized controller 800 operating in the same manner as discussed above, but additional sending the tokens to master controller unit 200$_1$" or 200$_2$" where master controller unit 200$_1$" or 200$_2$" takes control of a crane.

In other variants, the master controller units 200$_1$" 200$_2$" could store the IP addresses for all of the cranes and the centralized controller 800 could send tokens in the form of indicators such as Boolean flags or random generated numbers which are stored in the memory 204$_1$" or 204$_2$" (of the master controller units 200$_1$" 200$_2$") in association with the corresponding IP address. In the case where the token is a random generated number, the master controller unit 200$_1$" or 200$_2$" could then send the random generated number in communications including the control commands, as a form of authentication.

In other embodiments, it may be possible to use the centralized controller 800 with a plurality of keys 301 at the master controller unit 200'. In these specific embodiments, the centralized controller 800 act as an access point which authenticates the tokens stored on the keys 301 inserted into the slots 302 of the controller 200' before sending commands to the cranes 101.

Furthermore, it will be appreciated by the person skilled in the art that the use of a centralized controller 800 may be suitable it cases where it is desirable for the receiver or slave crane control unit of existing cranes to not be replaced.

Modes of Operation

Based on the embodiments discuss above, it will be appreciated by the person skilled in the art that the crane control system 100 and its variants may be operated in different modes. The following are examples of different modes of operation.

Synchronous and Independent Modes of Operation

Figure 13:
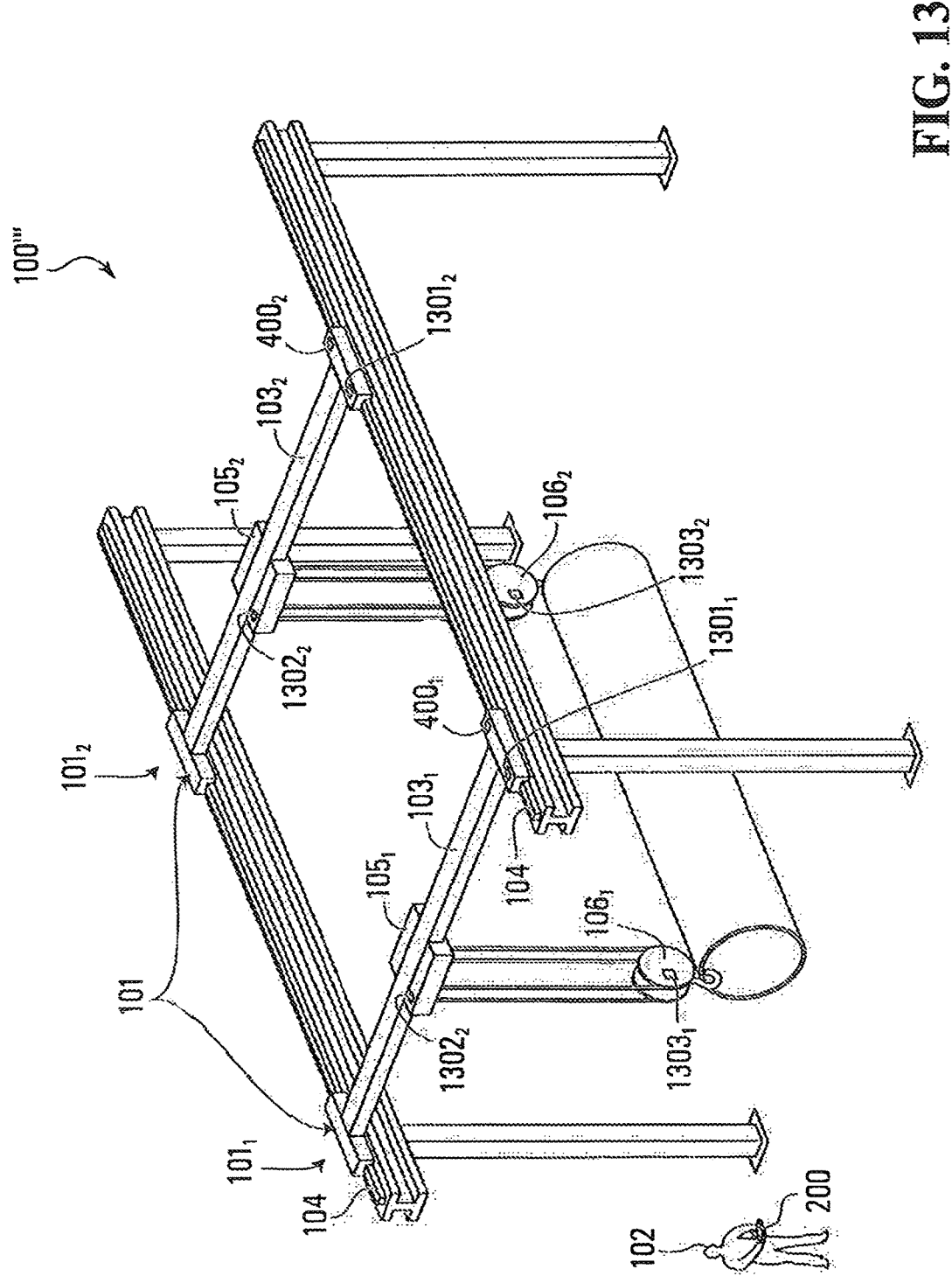
FIG. 13 is a perspective view of yet another variant of the crane controller system.

FIG. 13 illustrates an embodiment of a crane control system 100''', where the cranes 101 are controlled in either a synchronous or independent operating mode. FIG. 13 is similar to that of FIG. 1 with the addition of a plurality of sensors 1301$_1$, 1302$_1$, 1303$_1$, 1301$_2$, 1302$_2$, and 1303$_2$, which will be discussed in more detail later on. After the operator 102 has obtained at the master controller unit 200 the tokens for the cranes 101 that the operator 102 wishes to control (for this example, it is assumed that the operator 102 wishes to control both cranes 101$_1$ and 101$_2$), the operator 102 can select between two modes of operation. The first mode of operation is where multiple cranes 101$_1$ and 101$_2$ operate in a synchronous manner. The second mode of operation is when the cranes 101$_1$ and 101$_2$ operate individually.

Figure 14:
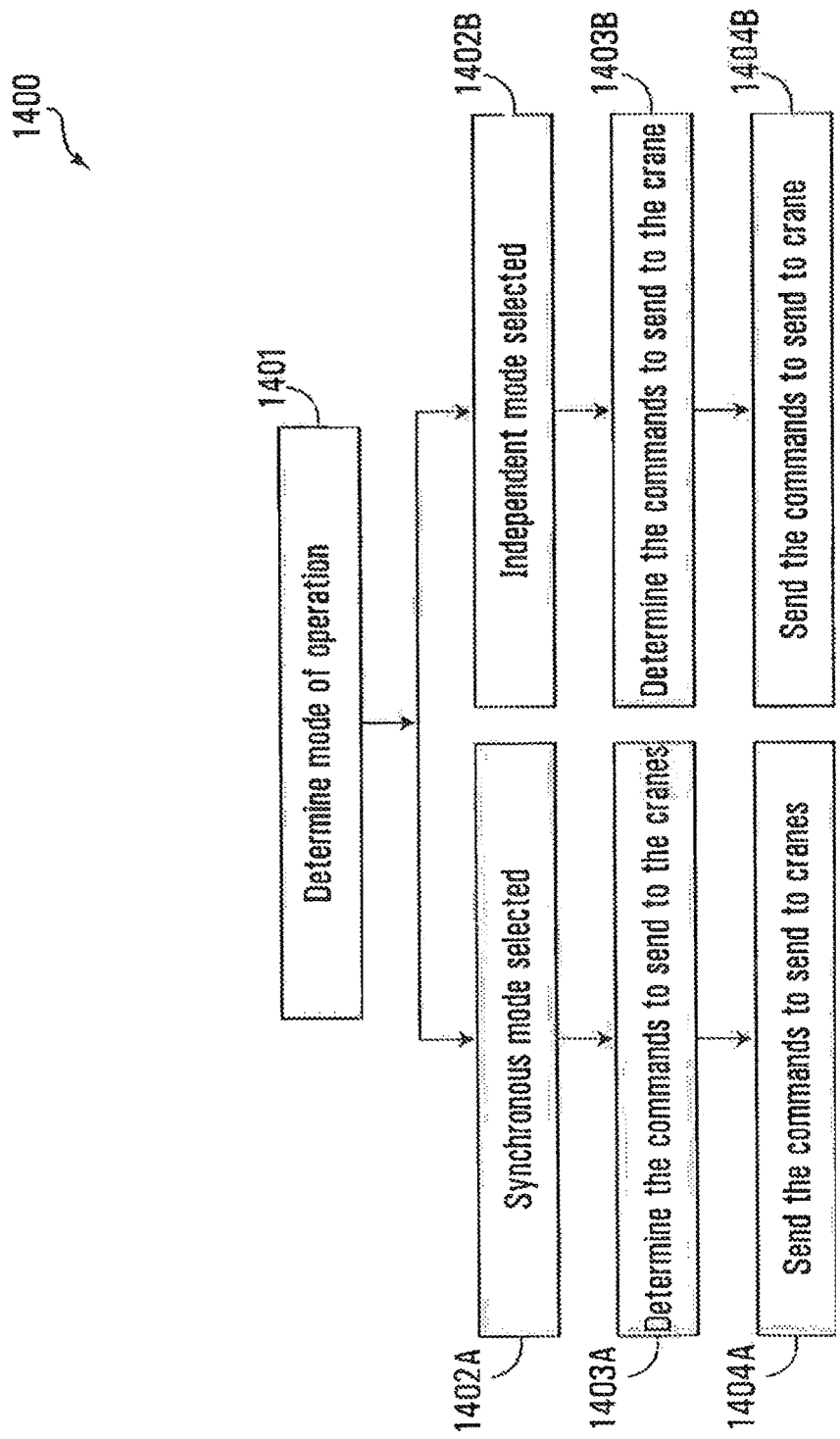
FIG. 14 is a flowchart of a process for setting a mode of operation of the master controller unit.

FIG. 14 is a flow chart 1400 of the steps that take place depending on the mode of operation that the operator 102 selects. At step 1401 the operator sets the mode of operation. For example, the graphical user interface 201 of the master controller unit 200 may allow for the operator to toggle between the two modes of operation. In some embodiments, the toggling between the two modes of operation is a physical switch, while in other embodiments the toggling is done by making a selection by use of the display 315 and input buttons 310 or 311.

In the case that the operator selects the synchronous mode or the first mode of operation (step 1402A), the cranes 101 operate in a synchronous manner, which means that the cranes 101 move together. However, it will be appreciated that all parts of the cranes 101 are not required to move identically to each other. For example, the position of the trolleys 105$_1$ 105$_2$ and the hoists 106$_1$ 106$_2$ may vary from crane to crane as the parts being moved by the multiple cranes 101 may be of varying sizes. Moreover, the bridges 103$_1$ 103$_2$, trolleys 105$_1$ 105$_2$ and hoists 106$_1$ 106$_2$ of different cranes 101 may move differently from each other when a part is being moved into a specific position. By way of an example, in the synchronous mode, the operator may configure the bridges 103$_1$ 103$_2$ of the cranes to move in a specific direction at a specific speed, while allowing the trolleys 105$_1$ 105$_2$ and the hoists 106$_1$ 106$_2$ to be non-synchronous, such that the operator can manually adjust the hoists 106$_1$ 106$_2$ and trolleys 105$_1$ 105$_2$.

In the first mode of operation, the crane control system 100 includes logic (e.g., processor and program code stored in memory) for determining the commands for the cranes (step 1403A) or more generally for the control of the cranes 101 in a synchronous manner. For instance, the processor unit 203 of master controller unit 200 determines the movement of all cranes 101 and their corresponding parts (e.g., bridges, trolleys and/or hoists) based on the commands inputted by the operator 102, such that when the communication interface 202 sends the commands to slave crane control units 400 of the cranes 101, all cranes move in a synchronous manner (step 1404A). The movement of the all cranes 101 and their corresponding parts (e.g., bridges, trolleys and/or hoists) may be proved by feedback to the master controller unit 200, such that master controller unit 200 can monitor the movement of the cranes 101 (and their parts) and make any adjustments to the movements (e.g., adjust speed or position) based on the feedback. In other words, feedback may be provided so that if required corrective steps may be taken to maintain synchronization. In the example illustrated, the cranes 101 have one or more position sensors 1301$_1$, 1302$_1$, 1303$_1$, 1301$_2$, 1302$_2$, and 1303$_2$ which can provide feedback information. More specifically, the bridge 103$_1$ has the sensor 1301$_1$, the trolley 105$_1$ has the sensor 1302$_1$ and the hoist 106$_1$ has the sensor 1303$_1$. Similarly, the bridge 103$_2$ has the sensor 1301$_2$, the trolley 105$_2$ has the sensor 1302$_2$ and the hoist 106$_2$ has the sensor 1303$_2$. The monitoring with the sensors 1301$_1$, 1302$_1$, 1303$_1$, 1301$_2$, 1302$_2$, and 1303$_2$ will be discussed in more detail later on.

In other embodiments, the centralized controller 800 may send the commands to the slave crane control units 400 of the cranes 101 to control the cranes in a synchronous manner based on commands received by the master controller unit 200. In general, in these other embodiments, the master controller unit 200 sends commands for synchronous operation to the centralized controller 800. Then, the centralized controller 800 processes the commands and sends commands to the slave crane control units 400 of the cranes 101 to control the cranes in a synchronous manner. More specifically, in these other embodiments, commands are entered into the user interface 201 of the master controller unit 200 by the operator 102 then the commands are sent to centralized controller 800, which then determines exactly which commands to send to each of the cranes $101_1$ and $101_2$. In other words, steps 1403A and 1403B for the flowchart 1400 may take place at the centralized controller and are not limited to being done at the master controller unit 200. Furthermore, in these other embodiments, the centralized controller 800 may then monitor the movement of the cranes 101 and their parts and make any adjustments to the movements (e.g., adjust speed or position) based on the feedback information.

Now turning to the case where the operator 102 selects the independent mode or the second mode of operation (step 1402B), the cranes $101_1$ and $101_2$ can then be operated individually from each other. For example, the crane operator 102 can configure the input controls of the user interface 201 to control only the movement of one crane. That is, there is a selector for determining which crane the operator 102 chooses to control. For example, with reference to FIG. 3, the operator 102 can push button A to select crane $101_1$ and when the operator wants to switch to crane $101_1$ the operator can push button B. However, in other cases, the operator 102 can configure the input controls of the user interface 201 to have multiple cranes available on the input controls. For example, a first subset of the input controls may corresponds to a first crane $101_1$ while a second subset of input controls may correspond to a second crane $101_2$ and the operator 102 can choose between which of the cranes to operate based on the subsets of input controls. Referring back to FIG. 14, once the operator 102 has determined which crane the operator 102 would like to control, the operator 102 can then entering in the commands through the user interface 201 of the master controller unit 200 such that the commands to send to the crane is determined (step 1403B) and then sent to the crane (step 1404B).

The second mode of operation may be preferred by the operator 102 over the first mode of operation is some cases. For example, when multiple cranes 101 need to be brought together in close proximity over the object to be lifted, the operator may choose to operate the cranes independently from each other. Then once the cranes 101 are brought into position the operator 102 then switches to the synchronous mode of operation.

In either mode of operation various commands may be input into the master controller unit 200 for controlling the cranes 101. For instance, the commands entered in may be a manual real-time movement of one or more of the cranes 101. For example, the operator 102 may move the one or more joysticks 313 to move the cranes in real-time. That is, as the operator 102 moves one of the joysticks 313 in one directions, the one or more of the cranes 101 moves in the direction of movement of the joystick 313. In the independent mode when the operator 102 moves one of the joysticks 313, the crane $101_1$ moves in the direction of movement of the joystick 313. By way of another example, in synchronous mode, when the operator 102 moves one of the joysticks 313, both of the cranes $101_1$ and $101_2$ move in the direction of movement of the joystick 313.

However, the movement or control of the cranes 101 is not limited to such a manual real-time movement. For instance, the operator 102 may enter higher-level commands that result in the cranes 101 maneuvering according to those commands. For example, the operator 102 may enter in the distance for the cranes 101 or parts of the cranes (e.g., bridge, trolley, and/or hoist) to move, the speed at which the cranes 101 or parts of the cranes (e.g., bridge, trolley, and/or hoist) are to move, and/or the location of which the cranes 101 or parts of the cranes (e.g., bridge, trolley, and/or hoist) are to move to. Furthermore, the commands entered need not be limited to fixed command, but may include commands that change with time, position or location. For example, the cranes 101 may move at a specific speed until they reach a certain position and then the cranes 101 may reduce speed and continue moving.

Automatic Positioning

In some embodiments, another mode of operation may include automatic positioning. In these embodiments, logic (e.g., processor and program code stored in memory) may be provided in the master controller unit 200, the plurality of slave crane control units 400 and/or the centralized controller 800 that would allow the plurality of cranes 101 to automatically position themselves at a certain predetermined location. For example, the operator 102 may identify a certain location in the plant where the operator 102 would like the plurality of cranes 101 to be located (for example, where an object to be lifted is located), and the plurality of cranes 101 would then move automatically to that specific location. For example, the operator 102 may specify the X, Y and Z coordinates for each hoist $106_1$ $106_2$ and then the cranes 101 would move the hoists $106_1$ $106_2$ to the specified position. The movement of the cranes 101 may be made in sequence, such that one crane moves and locates itself properly, followed by a second crane and so forth. Alternatively, the plurality of cranes 101 may move into position all at the same time, instead of in sequence.

Figure 15:
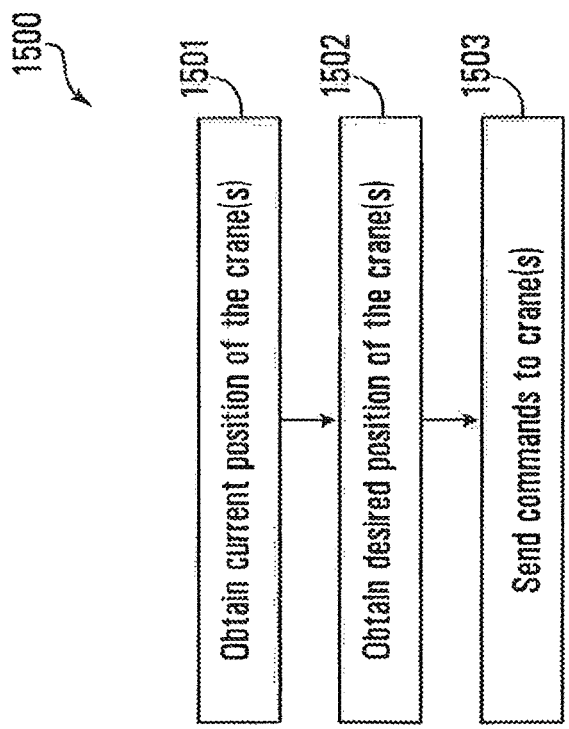
FIG. 15 is a flowchart of a process for maneuvering multiple cranes in an automatic positioning mode.

With reference to method 1500 of FIG. 15, the logic provided in the master controller unit 200, the plurality of slave crane control units 400 and/or the centralized controller 800 may first obtain the current positions of the cranes 101 (step 1501). The positions could be the X, Y, and Z coordinates of cranes 101 in the factory. For example, the positions of the cranes 101 could be the X and Y positions of the bridges $103_1$ $103_2$ and the trolleys $105_1$ $105_2$ and the Z position of the hoists $106_1$ $106_2$. Alternatively, the positions of the cranes could be the X, Y and Z plane positions of the hoists $106_1$ $106_2$. The X, Y and Z plane positions may be obtained by sensors located on the cranes or any other suitable means. Then, the desired positions of the cranes is entered at the master controller unit 200 (step 1502). The entering in of the desired positions may be the desired X, Y and Z coordinates of the cranes 101. For example, the desired positions of the cranes 101 could be the X and Y positions of the bridges $103_1$ $103_2$ and the trolleys $105_1$ $105_2$ and the Z positions of the hoists $106_1$ $106_2$. Then at step 1503, the commands are sent to the cranes 101, such that the cranes 101 move automatically to the desired positions.

Alternatively, in some embodiments of the invention, the operator 102 may select a profile on the user interface 201 of the master controller unit 200 that corresponds to an object that the operator 102 wants to move. The profile may include information such as the current position or location of the object in the plant and also the elevation of the lifting points to which the hoists of the cranes connect. In this mode of operation and on the basis of the settings in the profile, the operator 102 selects a profile and the plurality of cranes automatically adjust the heights of the hoists $106_1$ $106_2$, the position of the trolleys $105_1$ $105_2$ on the bridges $103_1$ $103_2$ and/or move in a synchronous manner such that the cranes 101 are brought into the proper locations for lifting the object.

In automatic position mode, a plurality of collision detection sensors (not illustrated) may also be positioned along the direction of the parallel runways 104 and between the runways and the floor to sense if any objects are currently located in the plant where the cranes operate and that would be within the path of travel of the crane. These collision detection sensors may be used by the logic that controls the movement of the cranes 101, such that the cranes 101 and their corresponding parts (e.g., bridge, trolley and/or hoist) move in manner that avoid the hoists $106_1$ $106_2$ of the cranes 101 from accidentally hitting any objects currently positioned in the plant underneath the range of movement of the cranes 101.

Monitoring of Cranes

In some embodiments, a safety mechanism monitors the overhead cranes 101 while they are moving to ensure that the cranes 101 are moving in synchronism. For example, a possible problem that can arise is when multiple cranes move an object and one of the cranes either stops working or cannot follow properly the other cranes. In these embodiments, a monitoring system is provided, using software based logic in the crane control system 100''' that continuously monitors the motion of each crane to determine if there is a loss of synchronization. For instance, the monitoring function receives a signal indicative of a synchronization loss and issues an emergency stop command to bring the plurality of cranes into a safe condition. For example, the monitoring function may be implemented at the processing unit(s) 403 located at the slave crane control units 400. In other embodiments, the monitoring function can be implemented at the processing unit located in the centralized controller 800. In other examples, the monitoring function can be implemented at the processing unit 203 located in the master controller unit 200.

One way of implementing the monitoring system is to provide each crane of the plurality of cranes 101 with suitable sensors such that the cranes report their movement to the slave crane control units 400, master controller unit 200 and/or to the centralized controller 800.

Figure 16:
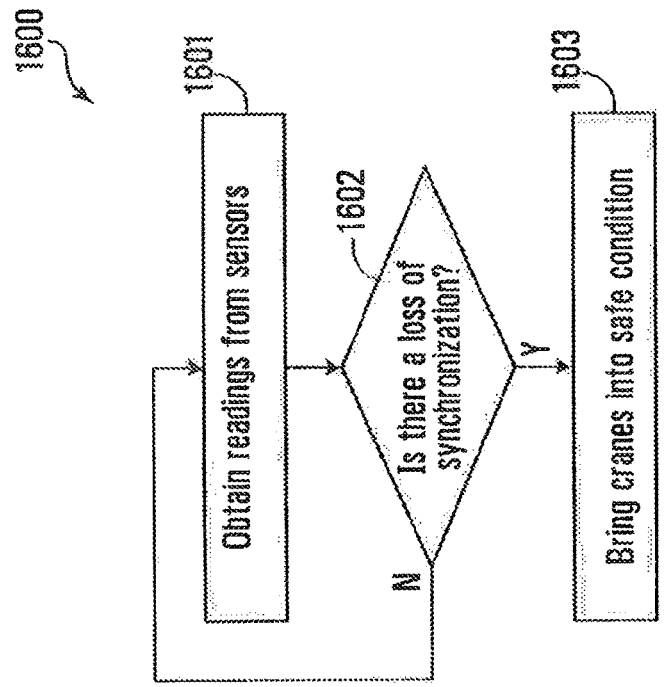
FIG. 16 is a flowchart of a process implemented by a monitoring system for detecting a synchronization loss between cranes.

FIG. 16 illustrates a flowchart 1600 for determining if there is a synchronization loss, where the monitoring system uses a plurality of sensors, such as motion encoders. At step 1601, the readings from the sensors are first obtained. Then the readings are processed to determine if there is a synchronization loss or not (step 1602). If there is no synchronization loss, monitoring of the sensors continues and another reading from the sensors is obtained. On the other hand, if there is a loss of synchronization, the cranes are then brought in to a safe condition (step 1603), which may include bringing the cranes to an emergency stop, moving the cranes into a safe position or taking another action.

Safe Condition

More specifically, a safe condition may include halting the movement of all parts of the cranes 101. A safe condition may also include moving the cranes 101 to a certain location or moving specific parts of the cranes 101 (e.g., bridge, trolley and/or hoist) to a specific position or location. A safe condition could also include continuing moving the cranes 101 but at a reduced speed. Furthermore, a safe condition may include a corrective action, which may include changing the speed, position of the specific parts of the cranes 101 (e.g., bridge, trolley and/or hoist), so that the cranes 101 continue to operate in a synchronous manner or to prevent damage to the crane control system 100'''. For example, to prevent damage, if one of the cranes breaks down and the other cranes have moved a certain amount before the loss of synchronization was detected, a corrective action can take place such that the other functioning cranes move back to a previous position.

Loss of Synchronization

The determination of a loss of synchronization can take two forms. In the first form, there may be an actual loss of synchronization. For example, when an actual loss of synchronization occurs some of the cranes 101 or the components of the cranes (e.g., bridge, trolley, and/or hoist) are no longer moving synchronously with each other.

In the second form of synchronization loss, there may be an impeding loss that will materialize if a corrective action does not take place. For example, a synchronization loss has not occurred yet but it is predictable and will likely occur in the future. For instance, if one of the cranes starts to move at a slightly slower speed that is currently not affecting the overall motion of the object being lifted by the multiple cranes, but the trailing crane will eventually fall back too much, a synchronization loss is declared. A corrective action that can be implemented is to adjust the speed of the other cranes to bring all cranes at the same speed point.

Example of Three Sensors Per Crane

In some embodiments, the monitoring system includes three sensors for each crane, such that two of the sensors track translational movement of the bridge and/or trolley in the X-Y plane and one for tracking translation movement of the hoist in the Z plane. It will be appreciated that when an object is lifted and it is displaced horizontally by the multiple cranes, the monitoring system compares outputs of the various sensors to make sure that they all remain in synchronism. In the case where there is a deviation in the outputs of the various sensors while the cranes are moving, the system is brought into a safe condition. Similarly, in the case where an object is being raised or lowered (i.e., movement in the Z plane) and there is a deviation in the outputs of the various sensors the system is brought into a safe condition.

For instance, one way to implement the three sensors per crane safety mechanism is illustrated in FIG. 13. The sensor $1301_1$ is positioned on the bridge $103_1$, the sensor $1302_1$ is positioned on the trolley $105_1$ and the sensor $1303_1$ is positioned on the hoist $106_1$. Similarly, the sensor $1301_2$ is positioned on the bridge $103_2$, the sensor $1302_2$ is positioned on the trolley $105_2$ and the sensor $1303_2$ is positioned on the hoist $106_2$. In this example, the sensors $1301_1$, $1302_1$, $1303_1$, $1301_2$, $1302_2$, and $1303_2$ provide the X, Y and Z positions for the hoists $106_1$ $106_2$, the trolleys $105_1$ $105_2$ and the bridges $103_1$ $103_2$ which can then be used to determine if a synchronization loss has occurred or not.

The sensors may be position encoders that output position information. The $_{sensors}$ output current position information, which is compared; if the synchronism is maintained between the cranes the position information should be changing at the same rate, otherwise a loss of synchronization has occurred.

Laser Range-Finding Device

Another way of implementing the monitoring system to determine a loss of synchronization is by assigning to one of the cranes the responsibility to monitor the distance with the other cranes. For example, this may be done via a laser range-finding device (not illustrated). As long as the distance stays constant, the system is assumed to operate correctly. However, if the distance changes, a fault is occurring and the system is brought to a safe condition.

Furthermore, any other suitable means for monitoring the locations or positions of the cranes 101 may be used.

In one specific example of implementation, the monitoring function that determines for a specific crane if that crane is losing synchronization is performed at the processing unit 403. The processing unit 403 monitors the various crane components and motion to determine if they all operate as intended. All the processing units 403 communicate with the master controller unit 200. The processing units 403 send to the master controller unit 200 messages to indicate if the respective crane is operating properly or not. The processing unit 203 of the master controller unit 200 receives those messages and performs different actions depending on the messages' content.

Assuming all the messages indicate that the cranes are operating correctly, the processing unit 203 manages the cranes as per the operator commands. This means that signals are sent to the cranes to control their motion in unison. However, if anyone of the messages sent by the processing unit 203 indicates a malfunction, the processing unit 203 recognizes the malfunction state after processing the message and will issue to all the cranes being controlled a command to put the cranes in a safe condition. In a specific example, the safe condition is an emergency stop, so the command send to each crane is an emergency stop command.

Non-Portable Master Controller Unit

Figure 17:
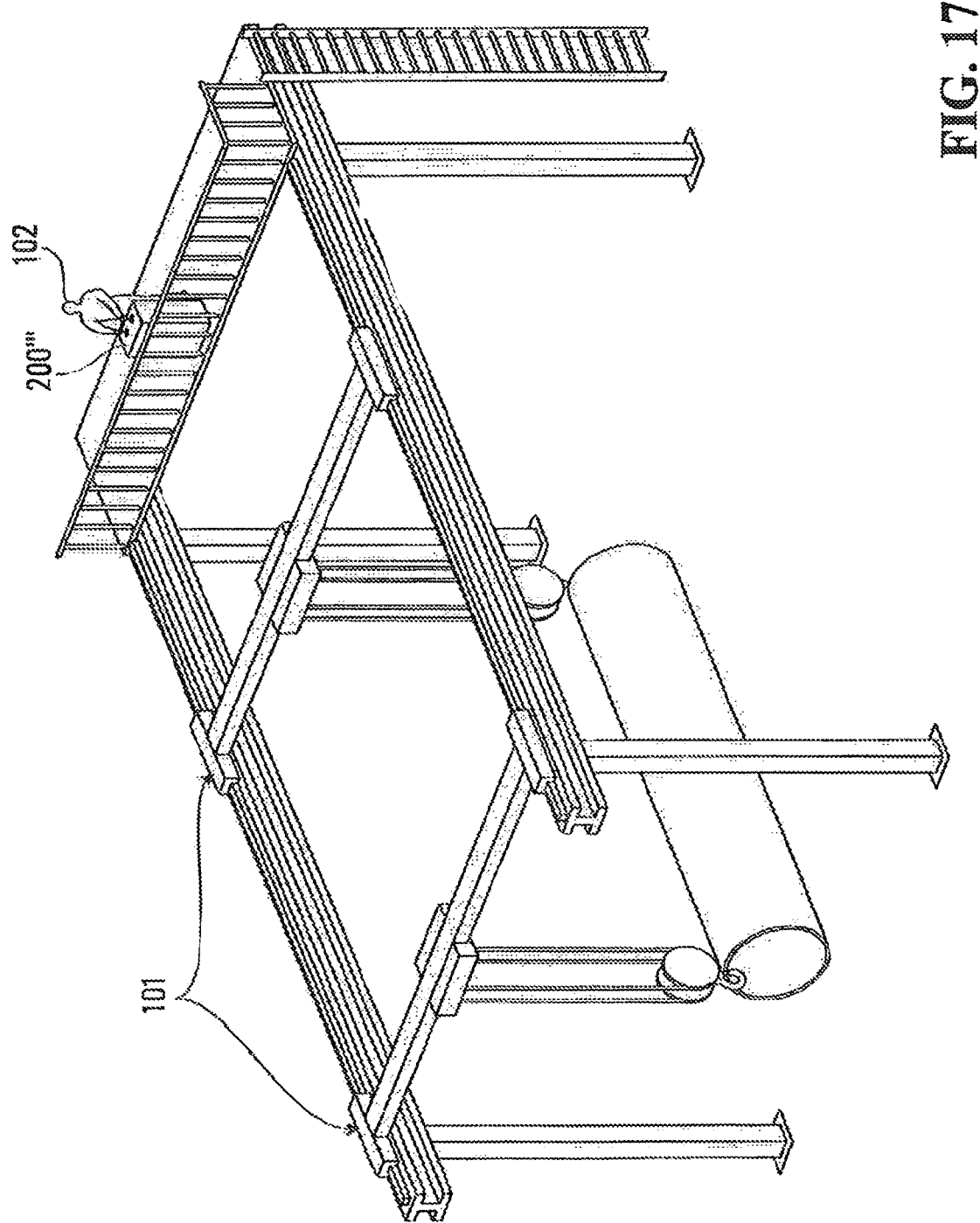
FIG. 17 is a perspective view of a crane control system using a master controller unit, which is hardwired.

Although in the embodiments discussed above, the master controller unit 200 and its variants was a portable master controller unit, that communicates wirelessly with the remaining components of the crane control system, the invention is not limited to such configuration. For example, FIG. 17 illustrates the case where the master controller unit 200''' is non portable, in the sense it remains in a fixed location and cannot be carried around. More specifically, master controller unit 200''' is a pendant that may be operated by the operator 102 and is connected either wired or wirelessly to the plurality of cranes 101.

Certain additional elements that may be needed for operation of some embodiments have not been described or illustrated as they are assumed to be within the purview of those of ordinary skill in the art. Moreover, certain embodiments may be free of, may lack and/or may function without any element that is not specifically disclosed herein.

Although various embodiments and examples have been presented, this was for the purpose of describing, but not limiting, the invention. Various modifications and enhancements will become apparent to those of ordinary skill in the art and are within the scope of the invention, which is defined by the appended claims.

The invention claimed is:

1. A crane control system for controlling a plurality of cranes including at least a first crane and a second crane, each said first and second crane having at least a first motion axis and a second motion axis, the crane control system comprising:
   a master controller unit; and
   a processing unit responsive to inputs by an operator of the master controller unit to send commands to the plurality of cranes to operate the cranes in synchronism, the processing unit being responsive to a signal indicative of a loss of synchronization between the cranes to output a command to bring one or more of the plurality of cranes into a safe condition;
   wherein the master controller unit is configured to be operable for controlling the first motion axis of the first crane to operate in unison with the first motion axis of the second crane and at the same time also controlling the second motion axis of the first crane to operate independently from and/or non-synchronous with the second motion axis of the second crane.

2. A crane control system as defined in claim 1, wherein:
   the safe condition includes an emergency stop; and/or
   the master controller includes the processing unit; and/or
   the commands to the plurality of cranes to operate the cranes in synchronism convey an address associated with the master controller unit; and/or
   each crane of the plurality of cranes has at least two independently movable motion axes, the commands to the plurality of cranes to operate the cranes in synchronism directing at least one motion axis of one crane to operate in unison with at least one motion axis of another crane while also directing at least one other motion axis of said one crane to operate independently from and/or non-synchronous with at least one other motion axis of said another crane.

3. A crane system comprising:
   the first crane;
   the second crane;
   the crane control system of claim 1 for controlling the first and second cranes in synchronism; and
   a monitoring system for monitoring the first and second cranes for a loss of synchronization therebetween.

4. A crane system as defined in claim 3, wherein the monitoring system includes sensors mounted on the first crane and on the second crane for sensing motion of the first crane and motion of the second crane.

5. A crane system as defined in claim 4, wherein the monitoring system includes a processing unit to process signals output by the sensors to detect a loss of synchronization.

6. A crane system as defined in claim 5, wherein the monitoring system has an output to output a control signal when the monitoring system detects a loss of synchronization.

7. A crane system as defined in claim 6, wherein the control signal conveys a command to bring the first crane and the second crane into a safe condition and/or an emergency stop.

8. A crane control system as defined in claim 1, wherein the first and second motion axes of the first and second cranes include a bridge motion axis for moving the corresponding first or second crane along a bridge, a trolley motion axis to move a trolley, and a hoist motion axis to move a hoist; and wherein the master controller unit is configured to:
   operate at least one of the bridge motion axis, trolley motion axis, and hoist motion axis of the first crane in unison with the corresponding one of the bridge motion axis, trolley motion axis, and the hoist motion axis of the second crane; and at the same time operate at least one other of the bridge motion axis, trolley motion axis, and hoist motion axis of the first crane independently from and/or non-synchronous with the corresponding one of the bridge motion axis, trolley motion axis, and the hoist motion axis of the second crane.

9. A crane control system as defined in claim 1, wherein each crane includes a slave crane control unit, and wherein the processing unit is responsive to inputs by an operator of the master controller unit to send commands to one or more of the slave control units of one or more individual cranes from the plurality of cranes.

10. A crane control system as defined in claim 9, wherein the master control unit has transmission and reception capabilities for sending and receiving communications to/from the slave control units.

11. A crane control system as defined in claim 9, wherein the master controller unit and the slave control units comprise transceivers, and wherein each slave control unit is operable for sending communications back to the master controller unit including acknowledgement of commands with an identifier of the master controller unit and an address or identifier of the slave control unit.

12. A crane control system for controlling cranes, the crane control system comprising:
   a master controller unit including a user interface for receiving user commands to control cranes, the user interface including a mode selector allowing the user to select a mode of operation among a plurality of modes of operation, the plurality of modes of operation including a first mode of operation and a second mode of operation;
   when the mode selector is in the first mode of operation, the master controller unit being configured to respond to user commands input at the user interface to output first command signals directed to a single crane; and
   when the mode selector is in the second mode of operation, the master controller unit being configured to respond to user commands input at the user interface to output second command signals directed to two or more cranes, each crane of the two or more cranes having at least two motion axes, the second command signals directing at least one motion axis of one crane to operate in unison with at least one motion axis of another crane and at the same time also directing at least one other motion axis of said one crane to operate independently from and/or non-synchronous with at least one other motion axis of said another crane.

13. A crane control system as defined in claim 12, wherein each crane has a bridge motion axis for moving the crane along a bridge, a trolley motion axis to move a trolley, and a hoist motion axis to move a hoist.

14. A crane control system as defined in claim 13, wherein in the second mode of operation, the second command signals being configured to move the bridge motion axes of the two or more cranes in unison and/or move the trolley motion axes of the two or more cranes in unison and/or move the hoist motion axes of the two or more cranes in unison.

15. A crane control system for controlling cranes, the crane control system comprising:
   a master controller unit including a user interface for receiving user commands to control cranes, the master controller unit being configured to respond to user commands input at the user interface to output command signals directed to two or more cranes, each crane of the two or more cranes having at least two motion axes, the command signals directing at least one motion axis of one crane to operate in unison with at least one motion axis of another crane;
   the user interface including a position selection mechanism configured to allow the user to select a position among a plurality of positions; and
   in response to selection of a position among the plurality of positions, the master controller unit outputting command signals directed to the two or more cranes to direct the cranes to move to the selected position,
   wherein the master controller unit is configured to be operable for controlling a first motion axis of a first crane to operate in unison with a first motion axis of a second crane and at the same time also controlling a second motion axis of the first crane to operate independently from and/or non-synchronous with a second motion axis of the second crane.

16. A crane control system as defined in claim 15, wherein the first and second motion axes of the first and second cranes include a bridge motion axis for moving the corresponding first or second crane along a bridge, a trolley motion axis to move a trolley, and a hoist motion axis to move a hoist; and wherein the master controller unit is configured to: operate at least one of the bridge motion axis, trolley motion axis, and hoist motion axis of the first crane in unison with the corresponding one of the bridge motion axis, trolley motion axis, and the hoist motion axis of the second crane; and at the same time operate at least one other of the bridge motion axis, trolley motion axis, and hoist motion axis of the first crane independently from and/or non-synchronous with the corresponding one of the bridge motion axis, trolley motion axis, and the hoist motion axis of the second crane.

* * * * *